United States Patent [19]
Kuen et al.

[11] Patent Number: 5,754,351
[45] Date of Patent: May 19, 1998

[54] EMBEDDED HEADER FOR SPLIT DATA SECTORS IN ZONED BIT RECORDED DISC DRIVES

[75] Inventors: Chi-Foun Kuen, San Jose; Randall Lee Pacek, Scotts Valley, both of Calif.

[73] Assignee: Seagate Technology, Inc., Scotts Valley, Calif.

[21] Appl. No.: 338,626

[22] PCT Filed: Sep. 6, 1994

[86] PCT No.: PCT/US94/10017

§ 371 Date: Nov. 22, 1994

§ 102(e) Date: Nov. 22, 1994

[51] Int. Cl.$^6$ ............................................... G11B 05/09
[52] U.S. Cl. ............................................... 360/48; 360/51
[58] Field of Search ........................ 360/48, 60, 78.06, 360/78.14, 77.04, 77.05, 51, 77.08, 72.1, 49; 369/275.3, 48, 32; 395/404

[56] References Cited

U.S. PATENT DOCUMENTS

| | | | |
|---|---|---|---|
| 4,827,462 | 5/1989 | Flannagan et al. | 369/32 |
| 5,050,013 | 9/1991 | Holsinger | 360/72.1 |
| 5,274,509 | 12/1993 | Buch | 360/48 |
| 5,305,302 | 4/1994 | Hardwick | 369/275.3 |
| 5,422,763 | 6/1995 | Harris | 360/51 |
| 5,438,559 | 8/1995 | Best et al. | 360/51 X |
| 5,474,540 | 12/1995 | Gold | 360/48 |
| 5,523,903 | 6/1996 | Hetzler et al. | 360/51 X |

FOREIGN PATENT DOCUMENTS

| | | |
|---|---|---|
| 519 764 | 6/1992 | European Pat. Off. . |
| 519764 | 12/1992 | European Pat. Off. . |
| 590 878 | 9/1993 | European Pat. Off. . |
| 90/15407 | 12/1990 | WIPO . |
| 9200589 | 6/1991 | WIPO . |
| 92/589 | 1/1992 | WIPO . |

OTHER PUBLICATIONS

Rod Kirk et al., Embedded Intelligence, BYTE, Mar. 1992, vol. 17-No. 3, pp. 195-196, 198, 200-203.
PCT International Search Report, PCT Application No.: PCT/US94/10017, International Filing Date Sep. 6, 1994, International Application of this National Application.
PCT International Preliminary Examination Report; PCT/US94/10017, International Filing Date Sep. 6, 1994, International Application of this National Application.
PCT Written Opinion, PCT/US94/10017, International Filing Date Sep. 6, 1994, International Application of this National Application.

Primary Examiner—Aristotelis M. Psitos
Assistant Examiner—Patrick Wamsley
Attorney, Agent, or Firm—Kinney & Lange, P.A.

[57] ABSTRACT

A sectoring circuit (22) locates data storage sectors in data tracks (60, 62) on a rotating disc (24) of a data storage device (20) having a transducer head (30) positioned by a servo system (44, 36) relate to the rotating disc (24) for writing to and reading from the sectors. The servo system (44, 36) provides servo errors in response to the transducer head (30) passing over servo patterns (64) embedded in the rotating disc (24). The sectors are positioned in data wedges (70–80, 82–92) extending between respective pairs of servo patterns. A header (66, 68, 93) is stored on the rotating disc (24) and is associated with a data wedge. The sectoring circuit (22) locates the header in reference to a servo pattern to receive and store information from the header including an identification field identifying the header and offset fields indicating a distribution of bytes for sectors split between data wedges. Control circuitry (176) locates the sectors based on values of the identification field and the offset fields.

16 Claims, 13 Drawing Sheets

EMBEDDED HEADER FOR SPLIT DATA SECTORS IN ZONED BIT RECORDED DISC DRIVES

The present invention relates generally to hard magnetic disc drives, and in particular, to locating data sectors on the magnetic discs of the magnetic disc drive.

In rotating media mass, storage devices, data is stored on magnetic, or magnetooptic discs, in a series of concentric tracks of differing diameters. The concentric tracks are each divided into sectors extending over the angles between two disc radii along the tracks. In particular, in rotating disc magnetic data storage devices, the discs have magnetizable surface coatings in which small portions, or cells, can have the magnetization therein varied from one to the next Data is written and subsequently read by transducer heads that are suspended over the surfaces of the disc to magnetize cells of the surface coating, for writing, or responding to differences in magnetization of the adjacent cells for reading. Both the read and write operations are controlled by a read/write controller that provides encoded data to the transducer head during writing and receives magnetically caused voltage pulses from the transducer heads during reading. For such a system to operate, the sectors in which cells are grouped must be located prior to reading or writing. It is common practice to encode some cells ahead of a data sector to serve as a header that identifies a following group of sectors. Some means must be provided to supply sector location pulses to the controller indicating the location of sector boundaries to enable writing or reading of the header information on the track as a transducer head approaches alignment with the header. Once the appropriate sector is reached and identified, reading or writing of data from or to the disc can proceed.

A soft sector scheme is a common scheme used to provide sector location information. In a soft sector scheme, sector boundaries are identified by address marks formed as a part of the sector. The address mark is such that it will not be mistaken for data, such as by having the address marks on the discs violate the code used in writing the data and the headers. A circuit is used to search for the address marks, which the controller places at the beginning of the sector. Such a circuit then provides sector location pulses to the read/write controller. The soft sector scheme has a known disadvantage of being susceptible to noise and media defects. The address marks on a disc can be lost becase of flaws in the magnetic medium in which data is written or by accidentally turning on a write gate, used to enable writing, as a transducer head passes over an address mark. In this last case, the data stored on the sector for that address mark can never be retrieved because a controller will never receive the pulses necessary for locating the sector. A more common problem results through read errors while searching for the address mark, which causes a sector to be missed and lowers the throughput of the data storage device.

A preferred alternative to the soft sectoring scheme has been the use of a hard sectoring scheme. In a hard sectoring scheme, the disc data storage device generates sector location pulses at the required interval without writing or recovering any special data from the data portion of the disc media itself. Instead, the transducer head detects servo patterns which are embedded in the rotating data storage disc itself. Alternatively, a separate servo head in alignment with the transducer head detects servo patterns written on the surface of a separate dedicated servo disc. The sector location pulses are usually generated with a simple circuit which counts out a desired time or number of bytes in a sector before issuing the next sector location pulse. This type of simple hard sectoring scheme has proven adequate for many years because the interval between sector location pulses was identical on every track of the disc storage device.

The desire to store as much data on a disc as possible lead to the recording of data at different frequencies for different tracks of the disc. A problem with the simple hard sectoring scheme resulted when the sector length from track to track began to be varied in rotating disc mass storage devices, such as in constant density recording schemes. In constant density recording schemes, the disc is divided into a plurality of concentric zones. The write frequency is different for each zone so that the bit/inch density is approximately constant for the entire disc. When the write frequency is highest, a greater number of sectors are located in a given track. In rotating disc data storage devices that utilize different data transfer rates for different tracks, sector location pulses must be supplied to the controller at different rates that depend upon the radial location of the transducer head on the disc. The use of the address marks in the soft sectoring scheme solves this problem, but resilts in the diadvantages described above.

Because of the diadvantages of the soft sectoring scheme, various hard sectoring schemes have been used in variable density/zone recording formats. One such scheme uses a sector counter which is reset for the new zone parameters by waiting for the occurrence of an index point. Here, the latency time increases since the scheme requires revalidation, at the index point, of the sector count when moving from zone to zone. Another solution provides a separate dedicated sector counter for each zone and switches to the appropriate counter when changing zones. This scheme adds complexity and cost to the hardware implementation and is impractical when a large number of zones are required.

Another prior art solution is disclosed in a patent assigned to the assignee of the present application, U.S. Pat. No. 5,050,013 to Holsinger, which is hereby incorporated herein by reference. The Holsinger patent describes a hard sectoring circuit comprising a master clock generator that is synchronized with the rotation rate of the disc to produce master clock signals that are indicative of distances along the disc, and a master reset generator that marks passage of an index location defined on the servo disc by the servo transducer head. The master clock sis are utilized to clock a counter following its resetting by a master reset signal generated by the master reset generator so that the counter provides a continuous indication of the location, or time-from-index, of the transducer head with respect to the index location on the disc. An accumulator is used to accumulate next sector times in response to accumulator clock pulses that are generated by an accumulator clock that is enabled by a comparator whenever the time-from-index counter exceeds or equals the next sector time in the accumulator. Thus, the accumulator is increased by one sector time each time the time from index counter reaches a sector pulse location. A sector location pulse generator generates the sector locan pulses to the controller. The accumulator and the counter are reset by the master reset generator after which a sector location pulse is generated each time a new sector is brought into angular aliment with a transducer head Another prior art solution is disclosed in the Wilson et al. U.S. Pat. No. 4,999,720, which is hereby incorporated herein by reference. The Wilson hard sectoring scheme comprises a single sector counter to provide the sector count for a plurality of recording zones. An angular position counter is also used to count at a master sector count having a frequency to match the occurrence of sectors in a reference zone. A look up table or a computational algorithm provides an offset value representing the difference between the angular position count and the occurrence of the next consecutive sector in each of the recording zones.

A hard sectoring scheme is desired for an embedded servo rotating disc data storage device which has the flexibility of a soft sectoring scheme, but uses the reliability of recurring servo pulses. It is desired that the hard sectoring scheme be implemented at a low cost and without adding excessive complexity to the sectoring system hardware. In addition, it is desired that the hard sectoring scheme be implemented on the data storage disc with a minimum of storage locations being allocated to the sectoring scheme itself.

SUMMARY OF THE INVENTION

The present invention relates to a sectoring circuit for locating data storage sectors in a series of concentric data tracks of differing diameters on a rotating disc of a data storage device having a transducer head positioned by a servo system relative to the rotating disc for writing to and reading from the sectors. The servo system provides servo error signals in response to the transducer head passing over servo patterns embedded in the rotating disc. The sectors are positioned in data wedges extending between respective pars of the servo patterns. The sectoring circuit includes an input receiver for receiving and storing information from a header. The header is stored on the rotating disc and associated with at least one of the data wedges. The input receiver locates the header in reference to at least one of the servo patterns. The header information includes an identification field identifying the header, a first offset field indicating the number of selected data groupings of the first sector of an associated data wedge stored in the associated data wedge, and a second offset field indicating the number of selected data groupings of the last sector of the associated data wedge stored in the associated data wedge. A controller locates the sectors based on values of the identification field, the first offset field, and the second offset field.

In a preferred embodiment of the present invention, a current sector counter counts a number of sectors written or read by the transducer head since the input receiver received the header to provide a current sector count representing this number of sectors. The selected data grouping is typically a byte and a byte counter counts a number of bytes of the current sector which have been written or read by the transducer head to provide a byte count representing this number of bytes. In addition, the header information includes a total sector field representing the total number of complete sectors and fractions of sectors stored in the associated data wedge. The controller locates the sectors based on the current sector count, the byte count, and the total sector field. The input receiver preferably receives and stores information from the header in response to a servo signal indicating a duration of the detection of the servo pattern by the transducer head.

A preferred embodiment of the invention includes header error correction circuitry that detects and corrects errors in the header information. Data error correction circuitry detects and corrects errors in the data written to or read from the sectors. The header correction circuitry preferably detects and corrects errors in the header information independently from the data error correction circuitry detecng and correcting errors in the data written to or read from the sectors. The separation of the header error correction circuitry and the data error correction circuitry enables the sectoring circuit of the present invention to handle error detection and correction of data for sectors that are split between two data wedges becuse the data error correction circuitry detects and corrects data written to or read from the current sector only if al the selected data groupings of the current sector have been written or read. Thus, when data from a sector is split between two data wedges, the data error detection and correction is suspended for that sector until the data is written or read from the second data wedge.

The input circuitry of the sectoring circuit according to the present invention preferably receives and stores defect management bits from the header information which indicate defective sectors of the current data wedge. Circuitry is preferably provided which is responsive to the defect management bits to prevent the transducer head from writing to or reading from the defective sectors.

Certain embodiments of the present invention locate data storage sectors on data storage discs which are formatted with one data wedge associated with each header. The present invention is also embodied in sectoring circuits which locate data sectors in data storage discs which are formatted with multiple data wedges associated with a single header. In either case, the present invention permits multiple sectors per header to increase format efficiency.

DETAILED DESCRIPTION OF THE PREFERRED EMBODIMENTS

Figure 1:
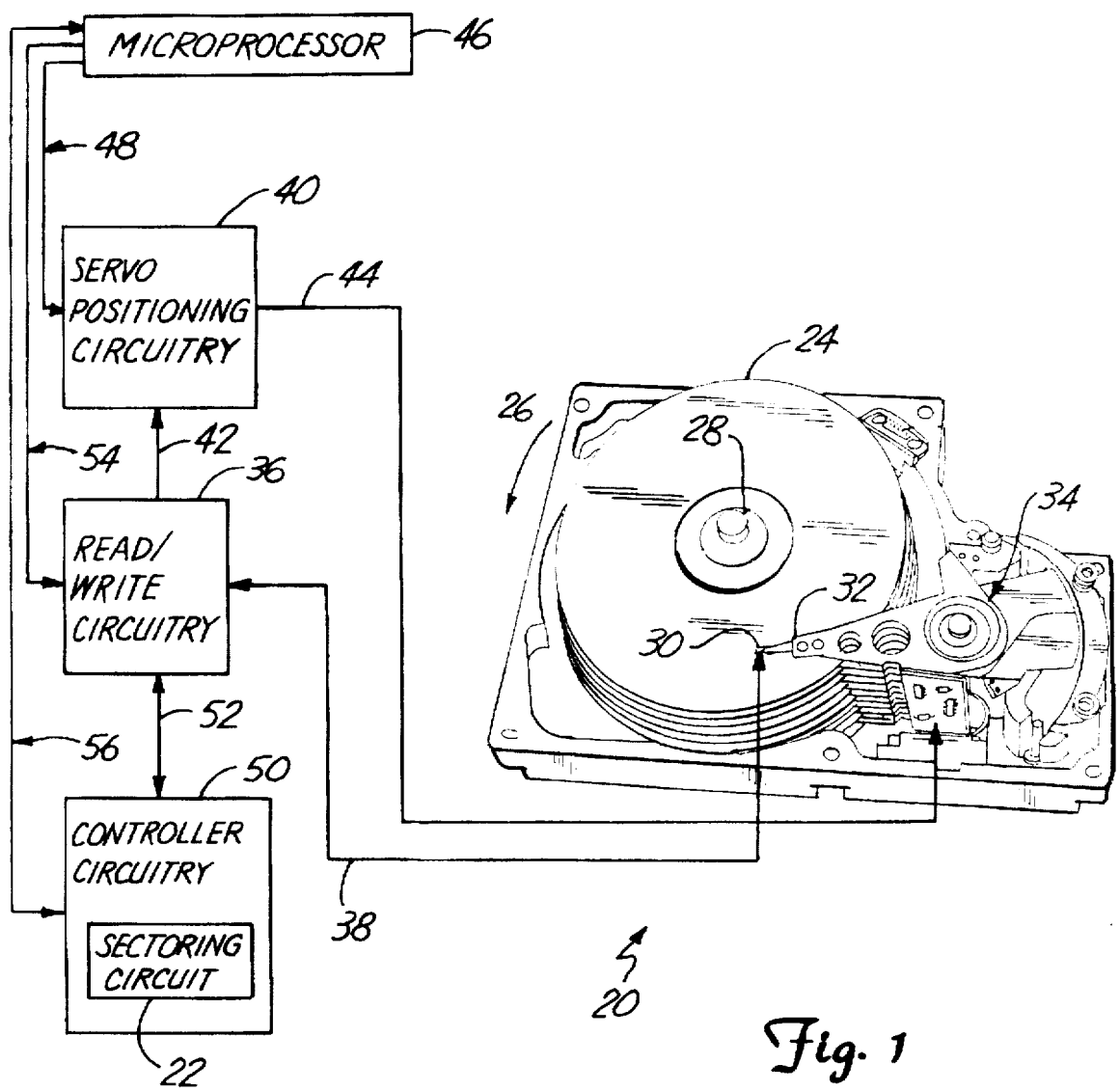
FIG. 1 is a schematic block diagram of a rotating disc data storage device including a sectoring circuit according to the present invention.

A rotating disc data storage device, designated by the numeral 20, is generally illustrated in a schematic block diagram form in FIG. 1. Rotating disc data storage device 20 includes a sectoring circuit 22 according to the present invention. Data storage device 20 receives information from a host computer (not shown) and stores the information on a data storage disc, such as data storage disc 24 shown in FIG. 1. As is conventional data storage device 20 comprises a plurality of data storage discs similar to storage disc 24. For clarity, the following description only refers to data storage disc 24. Data storage disc 24 rotates in the direction indicated by arrow 26 on a spindle 28. The information stored on data storage disc 24 is subsequently read from the disc in response to a request for the data by the host computer.

Data storage disc 24 has stored thereon the information received by data storage device 20 from the host computer in angularly extending sectors on concentric data tracks by writing to the sectors with a transducer head 30 that is suspended over the rotating data storage disc 24 by an actuator arm 32. An electromechanical actuator 34 moves actuator arm 32 to thereby move transducer head 30 over selected data tracks.

Read/write circuity 36 communicates with transducer head 30 via interconnection line 38. Transducer head 30 detects servo patterns embedded in rotating data storage disc 24 to provide position error signals to read/write circuitry 36. The embedded servo patterns on rotating data storage disc 24 interpret the data tracks, and the position error signals provide an indication of the alignment of transducer head 30 within a data track Read/write circuitry 36 responds to the position error signals provided on line 38 to provide a servo error signal to servo positioning circuitry 40 on interconnection line 42. Servo positioning circuitry 40 provides control signals to actuator 34 on interconnection line 44 that maintain the transducer head in alignment with a selected data track.

The host computer communicates with data storage device 20 through controller 50 over parallel data paths (not shown) and provides commands via controller circuitry 50 to a microprocessor 46. Microprocessor 46 provides positioning signals on interconnection line 48 to servo circuit 40 to cause, along with the servo error signal, servo circuit 40 to provide appropriate signals -over line 44 to actuator 34 for directing transducer head 30 to move between tracks in a conventional manner to a selected track where data is to be written to or read from. Controller circuitry 50 includes hardware to handle a protocol defining the format of communications passing therethrough between microprocessor 46 and the host computer. Thus, controller circuitry 50 communicates directly with the host computer and provides host computer commands to microprocessor 46.

Controller circuitry 50 provides control signals to and receives signals from read/write circuitry 36 via interconnection line 52. Read/write circuitry 36 provides encoded data to transducer head 30 received from the host computer via controller 50 during writing operations, and receives magnetically cause voltage pulses from transducer head 30 to be sent to the host computer via controller 50 during reading operations. Thus, the sectors on data storage disc 24 must be located prior to read/write circuitry 36 initiating writing or reading operations with data storage disc 24. Read/write circuitry 36 also provides a servo signal to controller circuitry 50 via line 52. The servo signal on line 52 indicates the duration of the detection of the embedded servo pattern by transducer head 30. Sectoring circuit 22 located in controller circuitry 50 is responsive to the servo signal on line 52 to locate data storage sectors within data wedges on data tracks of rotating data storage disc 24, such wedges extending between two servo patterns along a track Microprocessor 46 also receives commands from the host computer via controller 50 related to read/write circuitry 36 and provides signals representative of these commands to read/write circuitry 36 on interconnection line 54. The host computer also provides commands to microprocessor 46 via control circuitry 50 related to control circuitry 50, and microprocessor 46 provides signals representing these commands on interconnection line 56 to controller circuitry 50.

Figure 2:
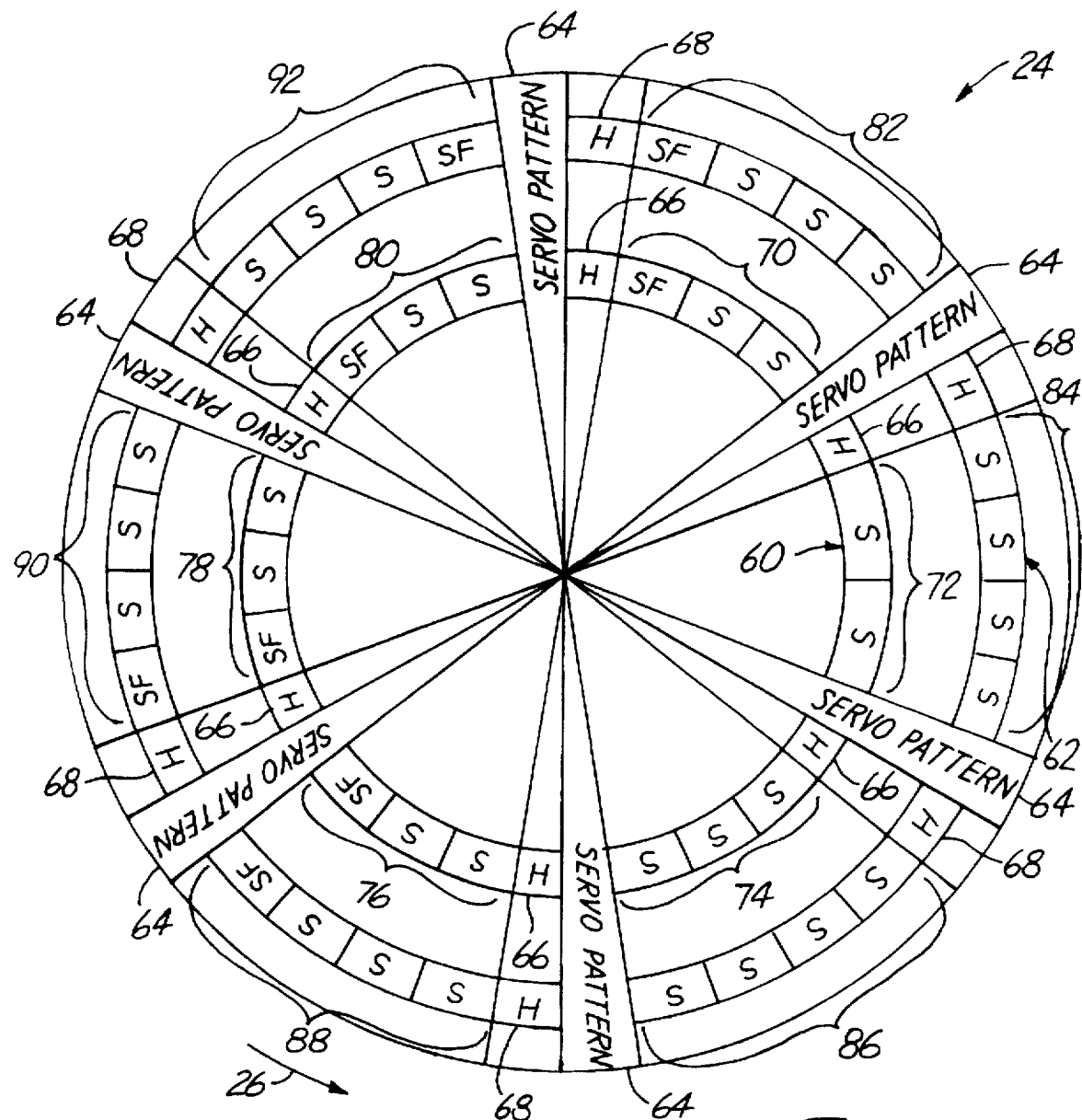
FIG. 2 is a schematic top plan view of a data storage disc having the embedded servo formatting scheme according to the present invention.

FIG. 2 lustrates how information is stored on angularly extending sectors in concentric data tracks on data storage disc 24. The layout of data storage disc 24 is purely for illustrative purposes and there are many other formats possible according to the present invention. For clarity, there are only two data tracks illustrated which are an inner diameter data track 60 and an outer diameter data track 62. Six servo patterns 64 are embedded in data storage disc 24 at 60° intervals. A header 66 is disposed adjacent each servo pattern following clockwise from the servo pattern on an inner diameter data track 60. A header 68 is disposed adjacent each servo pattern on data track 62 following clockwise from the servo pattern. Since each of the headers 66 and 68 follows a servo pattern the headers are easily located as described below. Six data wedges 70, 72, 74, 76, 78, and 80 are disposed on data track 60 such that each data wedge is sandwiched between a header 66 and a servo pattern 64. In a likewise manner, six data wedges 82, 84, 86, 88, 90, and 92 are disposed on data track 62 such that each data wedge is sandwiched between a header 68 and a servo pattern 64. As illustrated in FIG. 2, each of the data wedges disposed on data track 60 and data tack 62 comprise a plurality of data storage sector A data wedge, however, may contain only a fraction of a sector.

As illustrated in FIG. 2, data wedge 70 includes one sector fragment and two complete sectors. Data wedge 72 includes two complete sectors. Data wedge 74 includes three complete sectors. Data wedge 76 includes two complete sectors and a sector fragment. Data wedge 78 includes a sector fragment and two complete sectors. Data wedge 80 includes two complete sectors and one sector fragment. As to data track 62, data wedge 82 includes a sector fragment and three complete sectors. Data wedge 84 includes four complete sectors. Data wedge 86 includes four complete sectors. Data wedge 88 includes three complete sectors and one sector ment. Data wedge 90 includes one sector fragment and four complete sectors. Data wedge 92 includes three complete sectors and one sector fragment.

Each data wedge on data storage disc 24 can comprise at most two sector fragments because just the first sector and the last sector of a data wedge may be split across the corresponding one of the two end boundaries of that wedge to thereby be distributed between two adjacent data wedges. The information as to how many sectors are contained in a particular data wedge is contained in the header associated with the particular data wedge. The information of whether either the last sector is or the first sector is, or both, are split over two data wedges is also contained in the header associated with the particular data wedge.

Figure 3:
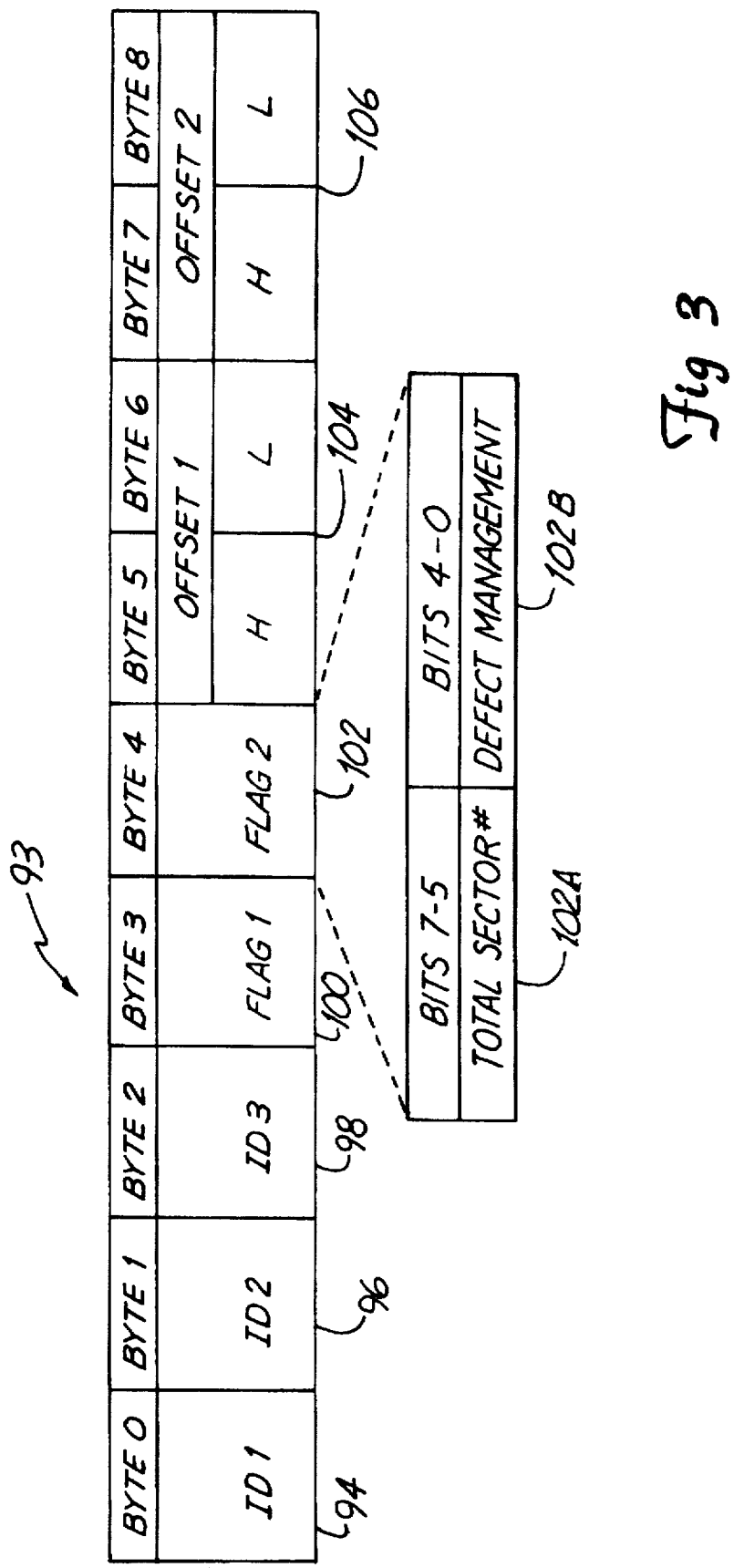
FIG. 3 is a diagram of a header used in the embedded servo formatting scheme of the present invention.

An example of a typical header is illustrated generally at 93 in FIG. 3. Example header 93 comprises nine bytes (byte 0-byte 8). Byte 0 comprises a first header identification field (ID 1), indicated at 94. Byte 1 comprises a second header identification field (ID 2), indicated at 96. Byte 2 comprises a third header identification field (ID 3), indicated at 98. Fields ID1 through ID3 together provide a unique identification of header 93. Byte 3 comprises a first flag field, indicated at 100. First flag field 100 comprises bits to indicate if the data wedge associated with header 93 contains the last sector of the data track First flag field 100 also comprises a bit to indicate whether there is less than one sector stored in the data wedge and this fraction of a sector stored in the data wedge is the last fragment of a split sector. This bit is only needed if the data storage device stores less than one sector in some data wedges.

Byte 4 comprises a second flag field, indicated at 102. Second flag field 102 comprises a total sector field, indicated at 102A, representing the total number of sectors and fractions of sectors stored in the data wedge associated with header 93. Second flag field 102 also comprises defect management bits as indicated at 102B. The function of the defect management bits is described below. Bytes 5 and 6 comprise a first offset field, indicated at 104. First offset field 104 is used to handle a sector which is split between the previous data wedge on the data track and the current data wedge associated with header 93. First offset field 104 indicates the number of bytes of the first sector of the data wedge that are stored in the data wedge. Bytes 7 and 8 of the header comprise a second offset field, indicated at 106. Second offset field 106 is used to handle a sector which is split between the current data wedge associated with header 93 and the next data wedge on the data track. Second offset field 106 indicates the number of bytes of the last sector of the data wedge that are stored in the data wedge.

There are five defect management bits contained in header 93 as indicated at 102B. Various defect management schemes exist to handle bad sectors which are discovered during the formatting of the data storage disc. The bad sectors are marked as bad by changing the state of a defect management bit. Thus, the binary state of a defect management bit indicates whether a sector is bad or good. With five defect management bits, header 93 can handle up to a maximum of five sectors. Certain defect management schemes have two bits associated with each sector to provide more information regarding bad sectors, such as by indicating good, skipped (bad), and reassigned (bad) sectors. In these defect management schemes, two bits are needed because at least three states are possible. Various management schemes are known and can easily be accommodated by adding additional bits or bytes to the header. In this way, bad sectors are not written to or read from.

Single Data Wedge Per Header

Figure 4:
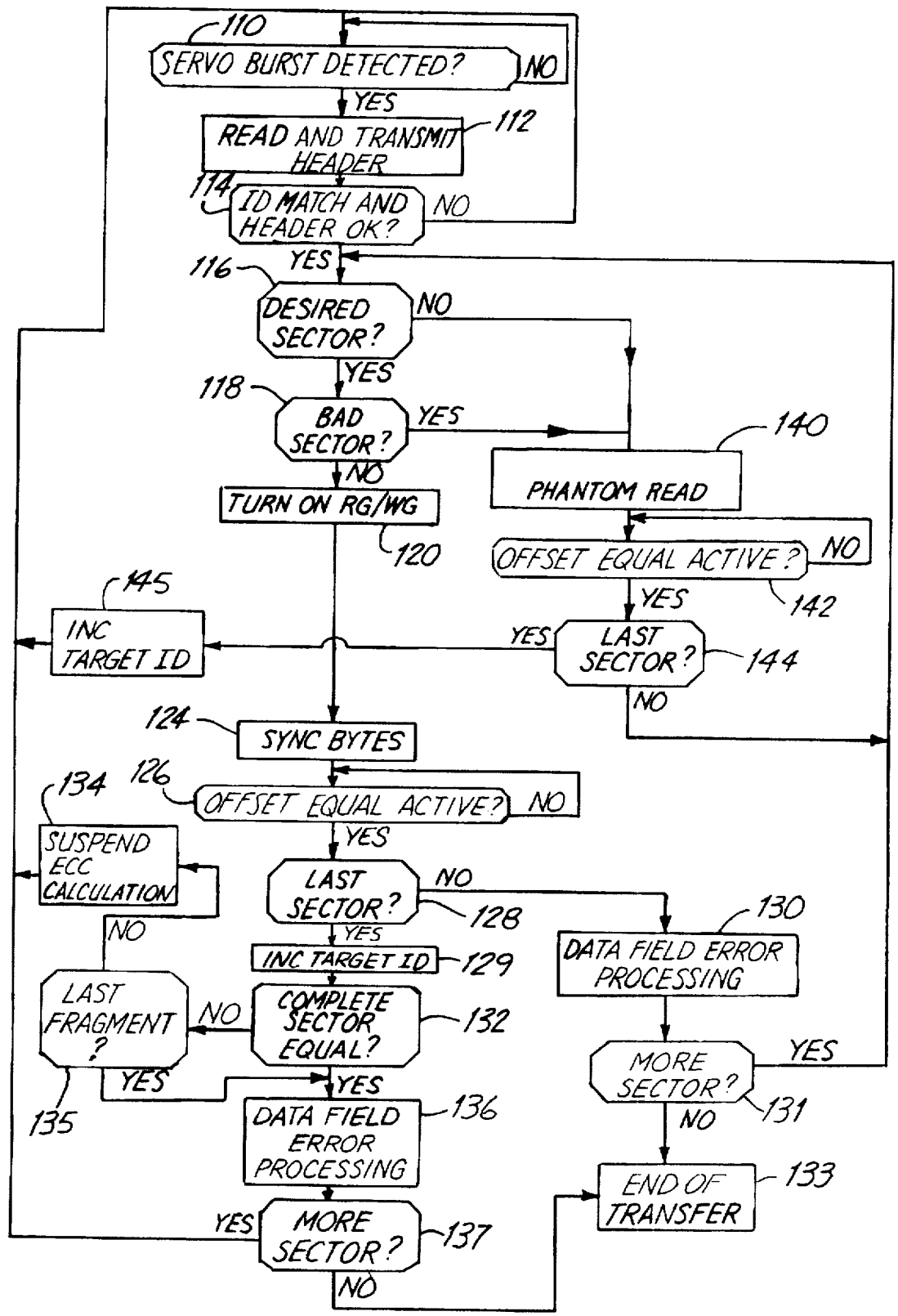
FIG. 4 is a read/write map flow chart of a one data wedge per header embodiment of the present invention.

As illustrated in FIG. 2, data storage disc 24 is formatted so that only one data wedge is associated with each header. A read/write map flow chart for a one data wedge per header example of the present invention is illustrated in FIG. 4. The algorithm of FIG. 4 starts at decisional block 110. At decisional block 110, read/write circuitry 36 waits for transducer head 30 to detect a servo pattern on data storage disc 24. Once transducer head 30 detects the servo pattern, transducer head 30 provides a burst of servo pattern magnetically caused voltage pulses, which have a lower frequency than the data, to read/write circuitry 36. Read/write circuitry 36 then reads the header associated with the most recent servo pattern as indicated at block 112. Also at block 112, read/write circuitry 36 provides header information to sectoring circuit 22.

Decisional block 114 indicates that sectoring circuit 22 compares the three byte header identification field from the most recently read header with a three byte target identification field provided by microprocessor 46. If the header identification field does not match the target identification field, then read/write circuitry 36 again waits for transducer head 30 to detect the next servo pattern on disc 24 as indicated by the branch from decisional block 114 back to decisional block 110. Also at decisional block 114, sectoring circuit 22 processes errors in the header by performing error detection and correction on the header based on an error correction code (ECC) corresponding to the header. If the header information contains errors that were not corrected by the header error processing, then read/write circuitry 36 again waits for transducer head 30 to detect the next servo pattern on the data storage disc, as indicated by the branch from decisional block 114 back to decisional block 110.

Figure 5:
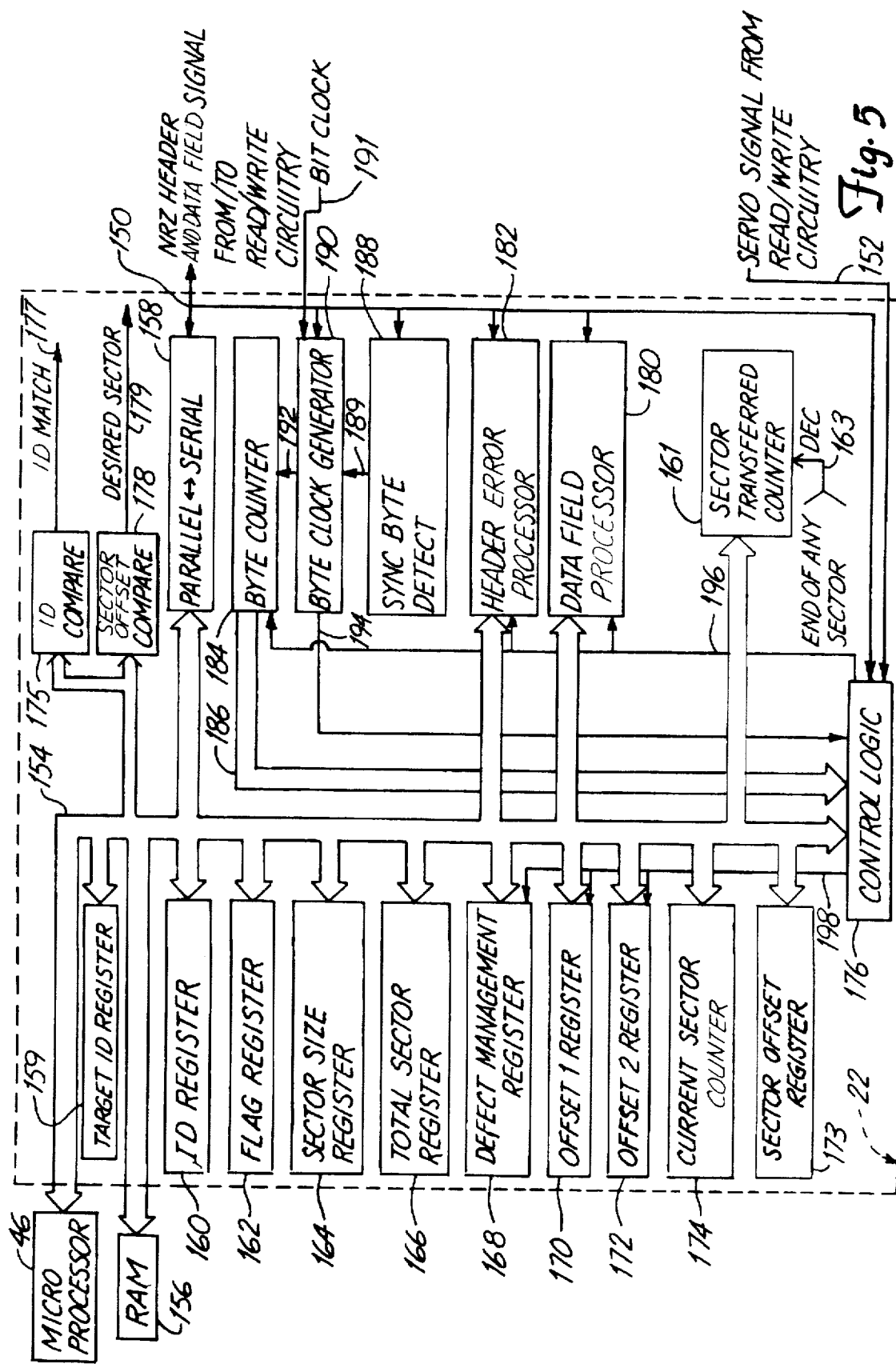
FIG. 5 is a block diagram of the sectoring circuit of FIG. 1.
Figure 6:
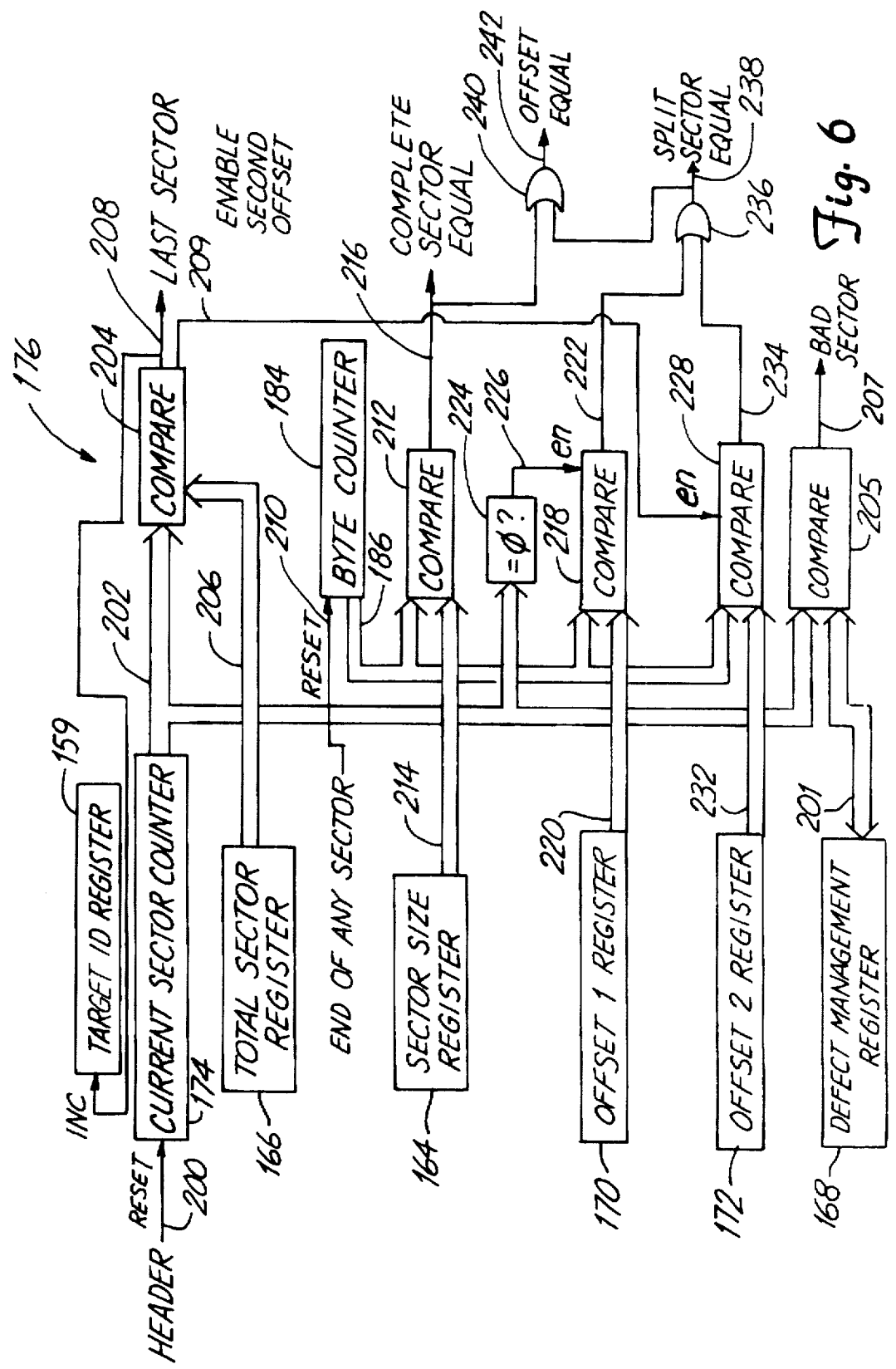
FIG. 6 is a more detailed block diagram of the control logic of FIG. 5.

If the header identification field matches the target identification field to indicate that the most recently read data wedge contains the desired sector then, as indicated at decisional block 116, sectoring circuit 22 compares a sector oft value provided by microprocessor 46 to a current sector count provided by a current sector counter (shown in FIGS. 5 and 6). The sector offset value represents where the desired sector is located in the current data wedge. The current sector count indicates the number of sectors of the current data wedge which have been written or read. If the current sector count is found to match the sector offset value in decisional block 116, decisional block 118 then indicates whether any bad sectors, as indicated by the defect management bits associated with the header, need to be skipped over. The operation performed if the desired sector is not matched, or if the defect management bit associated with the sector indicates a bad sector, is described below.

When the sector having a count value matching the microprocessor offset value is not a bad sector, sectoring circuit 22 signals read/write circuitry 36 to activate either a read gate signal or write gate signal to enable reading or writing of the matched sector, as indicated at block 120. Read/write circuitry 36 generates a bit clock, or read reference clock, output signal which is synchronized to the rotation rate of data storage disc 24 during read operations and to the write frequency during write operations. During write operations responding to the write gate signal, an oscillator or frequency synthesizer, internal to read/write circuitry 36, generates the bit clock output signal. During read operations responding to the read gate signal, a procedure in read/write circuitry 36 ascertains when to switch the bit clock output signal frequency from the internal oscillator frequency to a phase-lock loop (PLO) frequency obtained from a PLO in the read/write circuitry. This PLO has a frequency set by the data rate for data retrievals from data storage disc 24. The operation of such PLO synchronizing circuitry is known in the art, and is described in the Holsinger U.S. Pat. No. 5,050,013 incorporated by reference in the background section. The bit clock output signal based on either the internal oscillator or the PLO is provided to sectoring circuit 22 so that a byte counter therein (shown in FIGS. 5 and 6) will accurately count the bytes being written or read by transducer head 30.

Read/write circuitry 36 reads the data from data storage disc 24 and provides the data to sectoring circuit 22 in serial form in a signal having a non-return to zero (NRZ) signal format. Because the incoming data will be converted to parallel data, the byte boundaries must be determined by having a special pattern in the data which indicates byte boundaries. Accordingly, as indicated at block 124, synchronizing byte detection circuitry (shown in FIG. 5) contained in sectoring circuit 22 detects the special pattern in the NRZ header signal to indicate where the byte boundaries are located.

Once sectoring circuit 22 signals read/write circuitry 36 to activate either the read gate signal or the write gate signal sectoring circuit 22 waits for an offset equal signal, generated by the sectoring circuit, to become active, as indicated at decisional block 126. The offset equal signal is active when the number of bytes that have been read or written are equal to the number of bytes contained in the sector or sector fragment that is being read from or written to. Once the offset equal signal is activated, sectoring circuit 22 needs to ascertain whether the sector that has been written to or read from is the last sector for the associated data wedge, as indicated at decisional block 128. If the sector that has been written to or read from is not the last sector then, as indicated at block 130, sectoring circuit 22 processes errors in the data field by performing error detection and correction on the data field for that sector based on an ECC corresponding to the data field. As indicated by decisional block 131, after performing the error detection and correction, sectoring circuit 22 determines whether or not the desired number of sectors to be transferred for the given write or read operation, as specified by microprocessor 46, have been written or read. If the number of sectors specified by microprocessor 46 have not been written or read, the next sector in the data wedge is handled similar to the previous sector, as indicated by the branch from decisional block 131 back to decisional block 116. If the number of sectors specified by microprocessor 46 have been written or read, then, as indicated at block 133, the given transfer operation is complete.

If at decisional block 128, the sector being written to or read from was the last sector of the data wedge, then sectoring circuit 22 increments the target identification field first provided by microprocessor 46 considered as a binary number, as indicated at block 129 which indicates the next header associated with the next data wedge to be transferred for a given transfer operation. The target identification field is incremented because, in the particular addressing scheme described below for sectoring circuit 22, microprocessor 46 specifies the starting sector of a transfer operation by the target identification field and a sector offset. Microprocessor 46 also provides the number of sectors to be transferred for the given transfer operation. In this addressing scheme, the header identification fields are continuous and the sector offset specifies where the desired sector is located in the current data wedge. This addressing scheme is only one of a variety of addressing schemes that may be used in sectoring circuit 22. Once the target identification field is incremented, sectoring circuit 22 continues to process the current data wedge and needs to ascertain whether that last sector was a complete sector or a fraction of a sector, as indicated at decisional block 132. If the last sector is found in decisional block 132 to be a complete sector, then, as indicated by block 136, sectoring circuit 22 processes errors in the data field by performing error detection and correction on the data field for that sector.

If the last sector is a fraction of a sector (a non-complete sector), then that sector will be split over at least two adjacent data wedges. Thus, if the last sector is a non-complete sector, sectoring circuit 22 needs to know whether this last non-complete sector was the last fragment of a split sector (the wedge made consist of just a sector fragment), as indicated at decisional block 135. If this last sector fragment was not the last fragment of a split sector, then as indicated by block 134, the ECC calculation for the data field for the split sector is suspended until the next sector fragment is written or read for the given sector. This suspension can be over one or more servo pattern detections and over zero or more headers. The output of block 134 indicates a branch back to block 110 to wait for the next detection of a servo pattern. If this last sector fragment was the last fragment of a split sector, then sectoring circuit 22 processes errors in the data field by performing error detection and correction on the data field for the complete sector, as indicated by block 136. The last sector fragment can only be the last fragment of a split sector for the special case where there is less than one sector in the data wedge. In other words such a sector fragment is both the first and last sector fragment in the data wedge.

As indicated at decisional block 137, sectoring circuit 22 determines whether the last sector of the current data wedge was the last sector to be transferred for the given write or read operation. If the last sector was the last sector to be transferred, as indicated at block 133, the transfer is complete. If the last complete sector was not the last sector to be transferred, sectoring circuit 22 waits for the next servo pattern to be detected by transducer head 30, as indicated by the branch back to decisional block 110 from decisional block 137.

One of the features of the present invention is that there is one ECC associated with the header and a separate ECC associated with the data of each individual sector within the data wedge. This allows the error detection and correction of the header to be independent of the error detection and correction of the sector data. This ECC scheme accommodates sectors split across header boundaries by suspending the error detection and correction of the data stored in the split sector until all of the bytes of the complete sector are written to or read from. Thus, when data is split between two data wedges, the data error detection and correction is performed after the data is written or read from the scond data wedge.

If the desired sector does not match the sector to be written to or read from as indicated at decisional block 116, or if there is a bad matched sector as indicated at block 118, sectoring circuit 22 performs a phantom read, as indicated at block 140, because the sector having the current count value is a bad sector or has not been matched. When the desired sector does not match the sector to be written to or read from at decision block 116, sectoring circuit 22 performs the phantom read to proceed to the next sector location. When the defect management bits indicate that the sector having a count value matching the microprocessor offset value is a bad sector, at decisional block 118, sectoring circuit 22 performs the phantom read so that the bad sector will not be written to or read from. At decisional block 142, the phantom read is performed by waiting for the offset equal signal to become active indicating that the transducer head has moved over the number of bytes that would have been stored in the unmatched or bad sector location. Similar to decisional block 128, a decisional block 144 indicates that sectoring circuit 22 needs to ascertain whether this phantom read was performed over the last sector of the associated data wedge. If the phantom read was performed over the last sector, then sectoring circuit 22 increments the target identification field, as indicated at block 145. Sectoring circuit 22 then returns to the state indicated at decisional block 110 to wait for the next servo pattern to be detected by transducer head 30. If this is not the last sector, then the NO output of decisional block 144 indicates that sectoring circuit 22 returns to the state indicated at the input of decisional block 116 to compare the new sector count with the sector offset value.

A block diagram of sectoring circuit 22 is illustrated in FIG. 5. As indicated, sectoring circuit 22 receives from read/write circuitry 36 on a serial data interconnection line 150 a non-return to zero (NRZ) format signal containing the header information for the current data wedge and the data field for the sector in that wedge being written to or read from. Read/write circuitry 36 also provides the servo signal on serial data interconnection line 152 which indicates the duration of the detection of the servo pattern by transducer head 30. In addition, microprocessor 46 supplies commands and information to sectoring circuit 22 on parallel data paths 154. Sectoring circuit 22 communicates with a ram 156 over parallel data paths 154. Ram 156 stores the data field data from the sector being written to or read from A parallel to serial and serial to parallel converter 158 is coupled between serial data line 150 and parallel data paths 154 to provide translation between serial data provided by read/write circuitry 36 and parallel data provided on parallel data paths 154. Converter 158 receives the NRZ header and data signal on line 150 and provides both header and data information associated with the selected data wedge over parallel data paths 154.

A target identification (ID) register 159 stores the three byte target identification field indicated above that is provided on parallel data paths 154 from microprocessor 46. An ID register 160 stores the header identification fields from the header information provided on parallel data paths 154 by read/write circuitry 36, such as the header identification fields 94, 96, and 98 illustrated in FIG. 3. A sector-transferred counter 161 stores a value representing the number of sectors yet to be transferred for a given write or read operation. Microprocessor 46 provides a value to sector-transferred counter 161 on parallel data paths 154 representing the initial sectors to be transferred. The completion of writing to or reading from any sector activates input line 163 of sector-transferred counter 161 to cause the sector transferred counter to decrement the sector to be transferred value by one count. Thus, an individual transfer for the given read or write operation is indicated when the sector-to-be-transferred value in sector-transferred counter 161 is decremented to zero.

A flag register 162 stores flag information from the header information provided by read/write circuitry 36 on parallel data paths 154, such as the information contained in first flag field 100 of header 93 illustrated in FIG. 3. Thus, a last fragment bit being set in flag register 162 indicates that the data wedge contains only a fraction of a sector which is the last fragment of a split sector. As described above, the last fragment bit is not needed if each data wedge contains at least one complete sector or at least fractions of two sectors. A sector size register 164 stores a sector size value which is a binary representation of the number of bytes contained in a complete sector. Microprocessor 46 provides the sector size value to sector size register 164 on parallel data paths 154. A total sector register 166 stores the total sector field representative of the total number of sectors in the current data wedge, such as the total sector field contained in the second flag field 102 of header 93. A defect management register 168 stores the defect management bits for the current data wedge from the header information provided on parallel data paths 154 by read/write circuitry 36, such as the defect management bits of second flag field 102 of header 93. A first offset register 170 stores the first offset field from the header information provided on parallel data paths 154, such as the first offset field 104 of the header 93. A second offset register 172 stores the second offset field from the header information provided on parallel data paths 154, such as the second offset field 106 of header 93.

A current sector counter 174 keeps track of which sector in the current data wedge is being written to or read from by storing a current sector counter which is a binary representation of the number of sectors of the current data wedge which have been written or read. The current sector count is reset to zero with the receipt of a new header on the NRZ format signal on line 150 from read/write circuitry 36.

Current sector counter 174 counts the number of sectors that have been written to or read from data storage disc 24 since the receipt of the new header. A sector offset register 173 stores the sector offset value representing where the desired sector is located in the current data wedge. This sector offset value is provided to sector offset register 173 on parallel data paths 154 from microprocessor 46.

Control logic circuitry 176 provides the last sector signal, the complete sector equal signal and the offset equal signal which are indicated in the flow chart of FIG. 4. Control logic circuity 176 uses the values stored in the various registers and counters of sectoring circuit 22 to provide these control signals. The interaction of control logic circuitry 176 with the registers and counters of sectoring circuit 22 is described and illustrated in more detail in reference to FIG. 6.

An ID comparator 175 compares the three byte header identification field from the most recently read header stored in ID register 160 with the three byte target identification field provided from microprocessor 46 and stored in target ID register 159. Both the header identification field from the most recently read header and the target identification field are provided to ID comparator 175 from parallel data paths 154. ID comparator 175 provides an ID match signal on interconnection line 177 which is active when the header identification field matches the target identification field. A sector offset comparator 178 compares the current sector count from current sector counter 174 with respect to the last header to the sector offset value provided from microprocsor 46 and stored in sector offset register 173. The current sector count and the sector offset value are provided to sector comparator 178 on parallel data paths 154. Sector comparator 178 provides a desired sector signal on interconnection line 179 which is active when the sector offset value matches the current sector count.

The above-described sectoring addressing scheme is able to start from any sector in any data wedge. The above-described method for matching the ID from the header with the target ID and using a sector offset is only one example of such a sectoring addressing scheme wherein the sectoring addressing can start from any sector in the data wedge. In any scheme, the microprocsor specifies the starting sector identification and the number of sectors to be transferred. There are many other such schemes available. For example, another sector addressing scheme uses a header ID which represents the unique identification of the first complete sector or the first fragment of a split sector to be written or read during a transfer operation Unlike the above-described embodiment, this method has header identification fields which are not continuous. In this scheme, the target identification fields point directly to the desired sector and there is no need for a sector offset value. In other words, each sector has a unique address and the address associated with that sector or fraction of a sector corresponding to the target address is the first sector to be written or read during the given transfer operation. The present invention can be implemented using any of a variety of such addressing schemes.

Data field error detection and correction circuitry in error processor 180 detects and corrects the data field data of the current sector based on an ECC corresponding to the current sector data in response to signals from control logic 176. Header error detection and correction circuitry in error processor 182 performs error detection and correction on the header information associated with the current data wedge based on an ECC corresponding to the current header information. As mentioned previously, such circuitry for use with headers is separate from the similar purpose circuitry for use with sectors so that the header information can be detected and corrected independent from the data field data for each sector, and so that error detection and correction is not performed for sectors split across header boundaries until all of the bytes of the sector are written or read.

A byte counter 184 provides a current byte count, considered as a binary number representative of the number of bytes of the current sector being written to or read from data storage disc 24, to control logic circuitry 176 on parallel data path 186. Synchronizing byte detection circuitry 188 detects the special pattern in the NRZ format signal on line 150 indicating byte boundaries as described above. A sync byte signal is provided on interconnection line 189 to a byte clock generator 190 from synchronizing byte detection circuitry 188 to indicate the detection of the byte boundaries. Byte clock generator 190 generates a byte clock signal to byte counter 184 on interconnection line 192. The byte clock signal has active transitions representing the passage of transducer head 30 over bytes of data stored on data storage disc 24. Byte clock generator 290 also provides the byte clock signal on interconnection line 194 to control logic circuitry 176. Byte clock generator 190 receives the read reference clock or bit clock from read/write circuitry 36 on interconnection line 191 so that the byte clock is synchronized with the read/write circuitry.

As indicated in FIG. 5, control logic circuitry 176 provides control signals to byte counter 184, synchronizing byte detection circuitry 188, header error processor 182, and data field error processor 180 on serial data interconnection line 196. Additionally, a serial data interconnection line 198 couples control signals from control logic circuitry 176 to first offset register 170 second offset register 172, and defect management register 168. Control logic circuitry 176 receives the servo signal on line 152 from read/write circuitry 36. The servo signal indicates that the transducer head 30 has passed over a servo pattern on data storage disc 24.

Interaction of control logic circuitry 176 with the registers and counters of sectoring circuit 22 is illustrated in FIG. 6 in block diagram form. The current sector count provided by current sector counter 174 is a binary representation of the number of sectors that have been written to or read from data storage disc 24 by transducer head 30 since the last header. Reset interconnection line 200 of current sector counter 174 is activated with the receipt of a new header reflected in the NRZ format signal on line 150 which resets the current sector count to zero. Current sector counter 174 provides the current sector count on parallel data path 202 to a comparator 204. Total sector register 166 provides the total sector field, which is a binary representation of the total number of sectors for the current data wedge, on parallel data path 206 to comparator 204. Comparator 204 compares the current sector count on path 202 with the total sector field on path 206 to provide a last sector signal on interconnection line 208. The last sector signal on line 208 is active when the current sector count on path 202 matches the total sector field on path 206. The last sector signal on line 208 is provided to target ID register 159. When the last sector signal is active, the target ID stored in target ID register 159 considered as a binary number is incremented. Comparator 204 also provides an enable second offset signal on interconnection line 209 which is active when the current sector count on path 202 is one less than the number represented by the total sector field. The use of the enable second offset signal is described below.

Byte counter 184 provides the current byte count representing the number of bytes of the current sector which have been written to or read from, to a comparator 212 on parallel data path 186. Reset interconnection line 210 of byte counter 184 is activated after each sector is written to or read from by transducer head 30, which resets the current byte count on line 186 to zero. Sector size register 164 provides the sector size, representing the number of bytes of a complete sector, to a second input of comparator 212 on parallel data path 214. Comparator 212 provides a complete sector equal signal on interconnection line 216 which is active when the byte count on line 186 matches the sector size on line 214.

Byte counter 184 also provides the byte count on parallel data path 186 to a comparator 218. The first offset value stored in first offset register 170, representing the number of bytes of a split sector remaining from the previous data wedge to be written to or read from the current data wedge, is provided to comparator 218 on parallel data path 220. Comparator 218 compares the byte count on path 186 to the first offset value on path 220 and activates interconnection line 222 when the byte count on path 186 is equal to the first offset value on path 220. Current sector counter 174 provides the current sector count to a zero detect circuit 224 on parallel data path 202. Zero detect circuit 224 detects when the current sector count is zero, to thereby indicate that the current sector being written to or read from is the first sector of the current data wedge. Zero detect circuit 224 provides an enable signal to comparator 218 on enable interconnection line 226 to enable a comparison between the number of bytes represented by the byte count on path 186 and the number of bytes represented by the first offset value on path 220.

The byte count from byte counter 184 is also provided to a comparator 228 on path 186. Comparator 228 is enabled by activation of the enable second offset signal provided on line 209. The second offset value stored in second offset register 172, representing a number of bytes of a split last sector which are to be written to or read from the current data wedge, is provided to comparator 228 on parallel data path 232. Comparator 228 compares the byte count on path 186 and the second offset value on path 232 and activates interconnection line 234 when line 209 is active and the byte count on path 186 is equal to the second offset value on path 232. An OR gate 236 receives the output of comparator 218 on line 222 and the output of comparator 228 on line 234 and provides a split sector equal signal on interconnection line 238. The split sector equal signal on line 238 is active when either line 222 or line 234 is active. An OR gate 240 receives the split sector equal signal on line 238 and the complete sector equal signal on line 216 to provide an offset equal signal on interconnection line 242. The offset equal signal on line 242 is active when either the complete sector equal signal on line 216 is active or the split sector equal signal on line 238 is active.

Defect management register 168 provides the defect management bits associated with the current data wedge to a comparator 205 on parallel data path 201. Current sector counter 174 provides the current sector count on path 202 to comparator 205. Comparator 205 compares the defect management bits on line 201 with the current sector count on line 202 to determine if the current sector is a bad sector. Comparator 205 provides a bad sector signal on interconnection line 207 when the current sector is a bad sector.

Thus, control logic circuitry 176 provides the last sector signal on line 208 at the output of comparator 204, which corresponds to decisional block 128 of the flow diagram of FIG. 4, to indicate whether or not the last sector of the data wedge has been written to or read from. In addition, control logic circuitry 176 provides the complete sector equal signal on line 216 at the output of comparator 212, which corresponds to decisional block 132 of the flow diagram of FIG. 4, to indicate when a complete sector has been written to or read from. Control logic circuitry 176 also provides the offset equal signal on line 242 at the output of OR gate 240, which corresponds to block 126 of the flow diagam of FIG. 4, to indicate when all the bytes of a complete sector or all the bytes of a split sector which are contained in the current data wedge are written to or read from. Control logic circuitry 176 also provides the bad sector signal on line 207 at the output of comparator 205, which corresponds to decisional block 118 of the flow diagram of FIG. 4, to indicate when the current sector is a bad sector.

Figure 7:
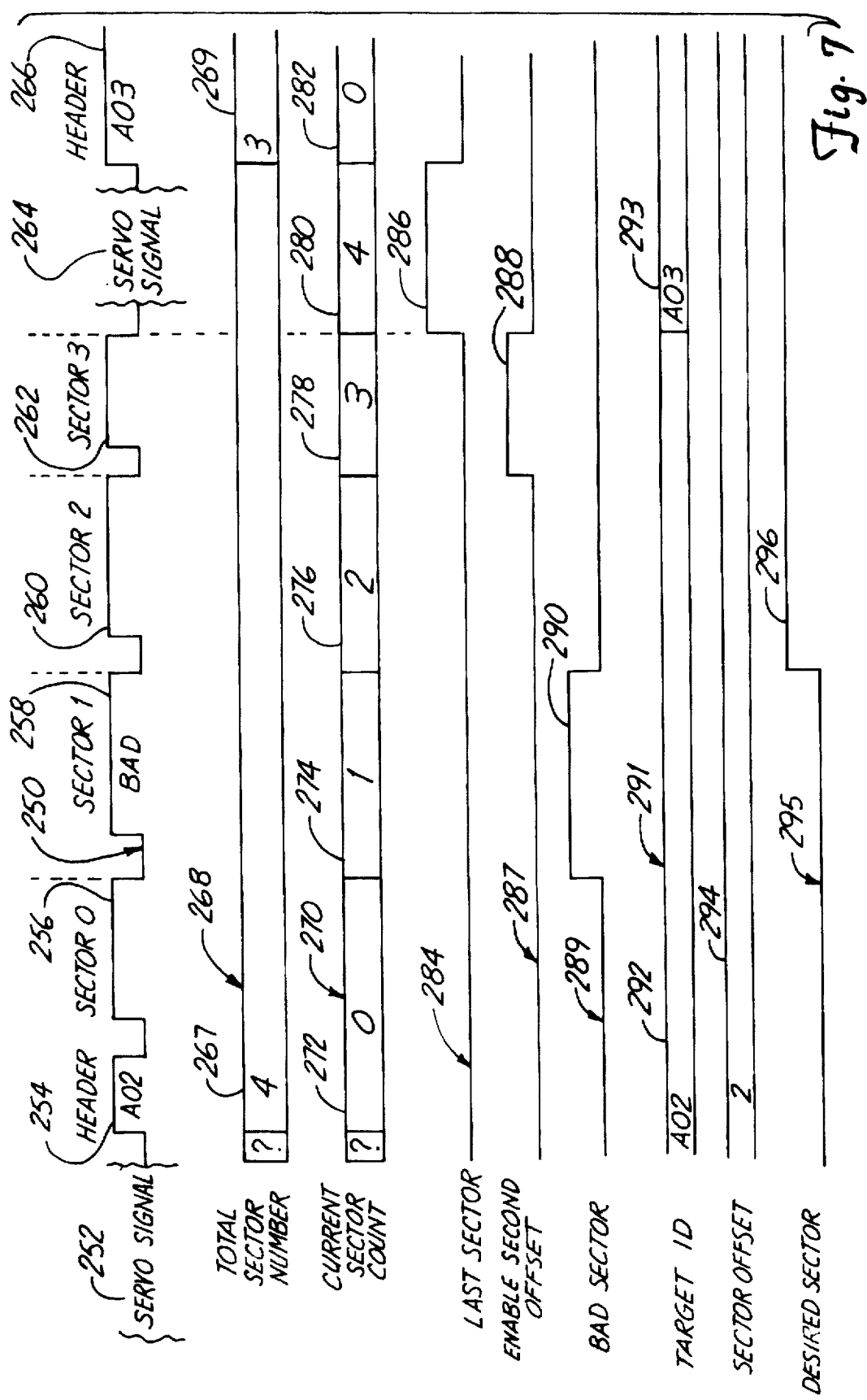
FIG. 7 is a timing diagram illustrating the operation of the sectoring circuit of FIGS. 5 and 6.

A one data wedge per header example is illustrated in timing diagram form in FIG. 7. An illustrative waveform 250 shows the waveform of the NRZ format signal containing the header information and the sector data from read/write circuitry 36 on line 150 as interrupted by the receipt of the servo signal from read/write circuitry 36 on line 152. As illustrated, a first servo signal portion is received at time point 252 and a first header is received over the NRZ format signal at time point 254. The sector zero data of the example data wedge is received at time point 256. The sector one data is received at time point 258. The sector two data is received at time point 260. The sector three data is received at time point 262. Thus, in this example, sectoring circuit 22 receives four sectors from read/write circuitry 36. A second servo signal portion is received at time point 264 and followed by the receipt of a second header at time point 266.

The total sector number obtained from the first header at time point 254 is stored in binary form in total sector register 166 and is represented in FIG. 7 as register contents 268 that change over time. With the receipt of the first header at time point 254, the total sector number for this example is set to four, as indicated at contents time point 267. With the receipt of the second header at time point 266, the total sector number changes to three, as indicated at contents time point 269. The current sector count provided by current sector counter 174 is represented in FIG. 7 as counter contents 270 that change over time. With the receipt of the first header at time point 254, the current sector count is reset to zero, as indicated at contents time point 272. After sector zero is received at time point 256, current sector counter 174 increments the current sector count to a one, as indicated at contents time point 274. After sector one is received at time point 258, current sector counter 174 increments the current sector count to a two, as indicated at contents time point 276. Likewise, after the receipt of sector two at time point 260, the current sector count is incremented to a three, as indicated at contents time point 278, and after the receipt of sector 3 at time point 262, the current sector count is incremented to a four, as indicated at contents time point 280. With the receipt of the second header at 266, the current sector count is reset to zero as indicated at contents time point 282.

The value of the last sector signal provided on line 208 is indicated by waveform 284. As indicated, the last sector signal is active at time point 286 when the current sector count is incremented to four at contents time point 280, which corresponds to when the current sector count is equal to the total sector number, indicated in register contents 268 of total sector register 166. The value of the enable second offset signal provided on line 209 is indicated by waveform 287. As indicated, the enable second offset signal is active at time point 288 when the current sector count is incremented to three at contents time point 278, which corresponds to when the current sector count is one less than the total sector number, indicated in register contents 268 of total sector register 166.

The value of the bad sector signal provided on line 207 is indicated by waveform 289. As indicated in illustrative waveform 250, in this example, sector one is marked as a bad sector by the defect management bits. Correspondingly, the bad sector signal is active at time point 290 corresponding to when sector one data would be received at time point 258.

The value of the target identification field obtained from microprocessor 46 and stored in target identification register 159 is represented in FIG. 7 as register contents 292 that change one time. As indicated, the target identification field is represented by "A02" at time point 291, which matches the three byte header identification field "A02" for the first header received at time point 254. Similarly, at time point 293, the target identification field is indicated "A03" which matches the header identification field "A03" for the second header received at time point 266.

The sector offset value stored in sector offset register 173 is represented in FIG. 7 as register contents 294 that changes over time. As indicated, the sector offset value for the first example data wedge is two, which indicates that the first sector to be written or read is the third sector of the example data wedge. The value of the desired sector signal provided on line 179 is indicated by waveform 295. As indicated, the desired sector signal becomes active at time point 296 when the sector offset value indicated in register contents 294 is equal to the current sector count indicated at contents time point 276.

Multiple Data Wedge Per Header (Method 1)

Figure 8:
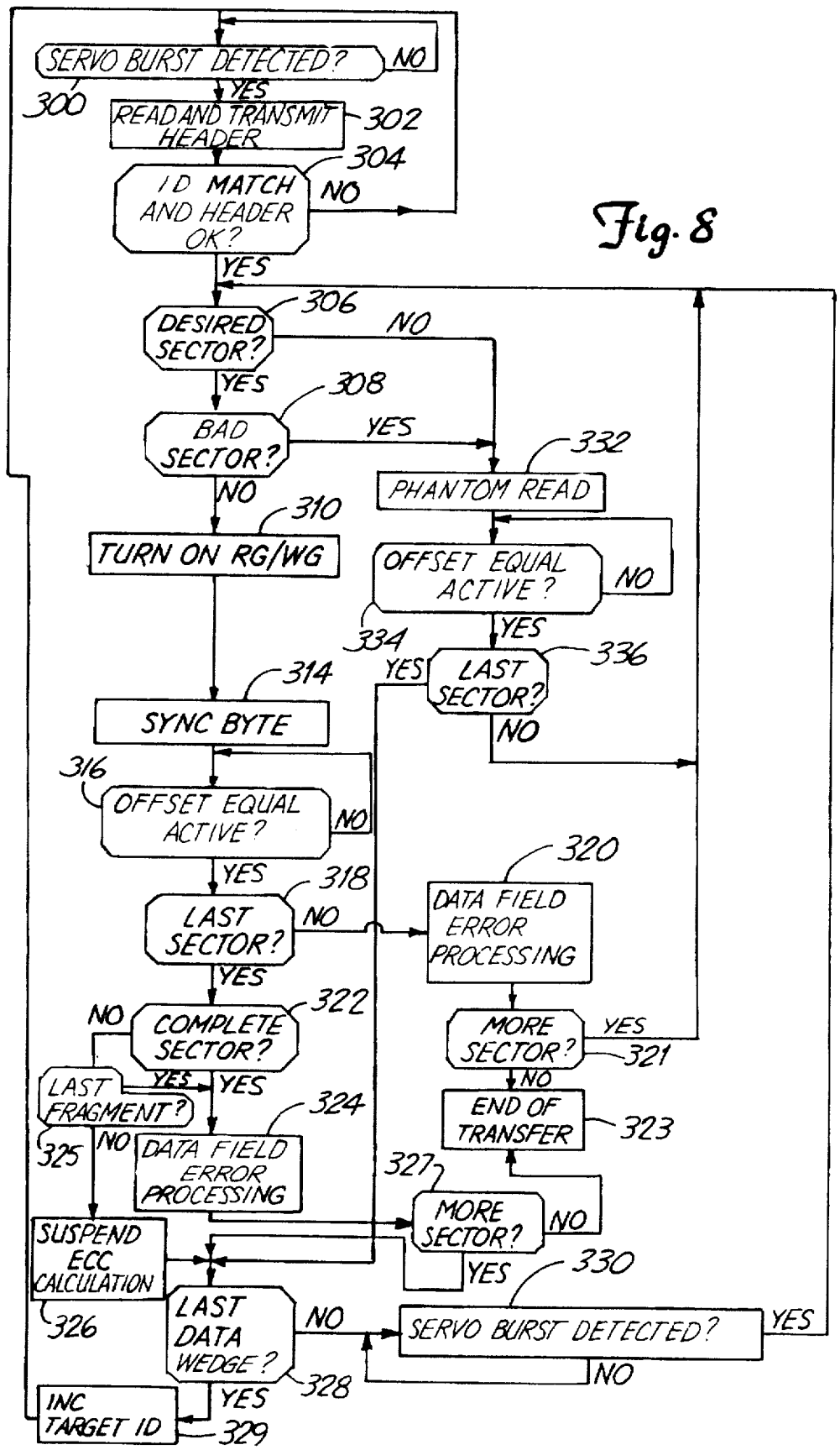
FIG. 8 is a multiple data wedge per header read/write map flow chart of an embodiment of the present invention.

Sectoring circuit 22 described above and illustrated in FIGS. 4–7 operates to locate data storage sectors on data storage disc 24, which is formatted so that only one data wedge is associated with each header. The present invention is also embodied in a sectoring circuit 290 (illustrated in block diagram form FIG. 9) which locates data sectors in a data storage disc (not shown) which is formatted so that there are multiple data wedges associated with a single header. Referring to FIG. 8, a read/write map flow chart corresponding to sectoring circuit 290 illustrates a first method of handling a storage disc formatted with multiple data wedges per header according to the present invention. The algorithm of FIG. 8 starts at decisional block 300. At decisional block 300, read/write circuitry 36 waits for transducer head 30 to detect a servo pattern on the data storage disc. Once trsducer head 30 detects the servo pattern, transducer head 30 provides a burst of servo pattern magnetically caused voltage pulss, which have a lower frequency than the data, to read/write circuitry 36. Read/write circuitry 36 then reads the header associated with the most recent servo pattern, as indicated at block 302. Also at block 302, read/write circuitry 36 provides header information to sectoring circuit 290.

Decisional block 304 indicates that sectoring circuit 290 compares a three byte header identification field from the most recently read header with a three byte target identification field provided by microprocessor 46. If the header identification field does not match the target identification field, then read/write circuitry 36 again waits for transducer head 30 to detect the next servo pattern on the data storage disc, as indicated by the branch from decisional block 304 back to decisional block 300. Also at decisional block 304, sectoring circuit 290 process errors in the header by performing error detection and correction on the header based on an ECC corresponding to the header. If the header information contains errors that were not corrected by the header error processing, then read/write circuitry 36 again waits for transducer head 30 to detect the next servo pattern on the data storage disc, as indicated by the branch from decisional block 304 back to decisional block 300.

Figure 9:
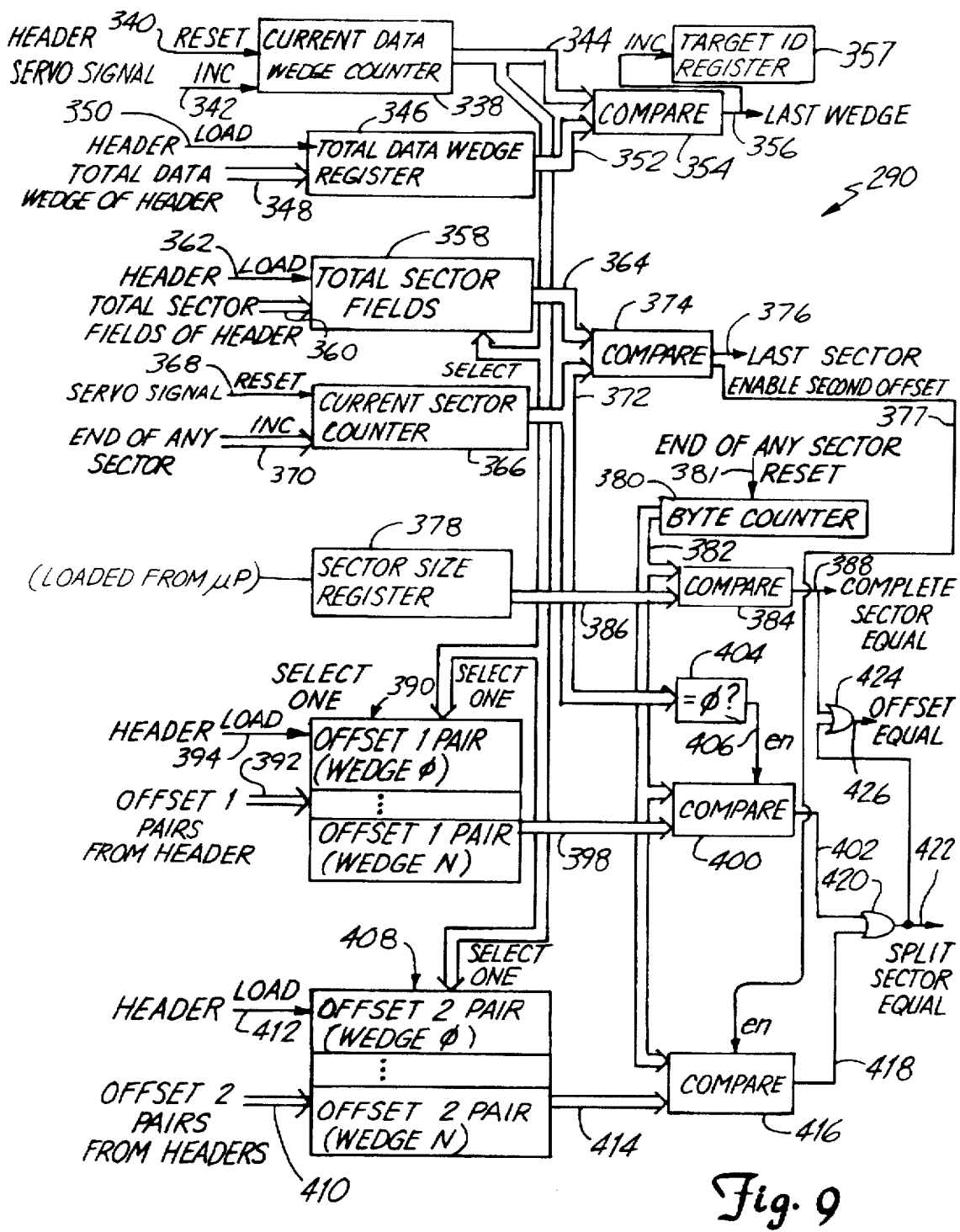
FIG. 9 is a block diagram of a sectoring circuit for the multiple data wedge per header embodiment of FIG. 8.

If the header identification field matches the target identification field to indicate that the most recently read header is associated with the desired sector then, as indicated at desional block 306, sectonng circuit 290 compares a sector offset value provided by microprocessor 46 to a current sector count provided by a current sector counter (shown in FIG. 9). The sector offset value represents where the desired sector is located in the current data wedge. The current sector count indicates the number of sectors of the current data wedge which have been written or read. If the current sector count is found to match the sector offset value in desional block 306, decisional block 308 then indicates whether any bad sectors, as indicated by the defect management bits acted with the header, need to be slipped over. The operation performed if the desired sector is not matched, or if the defect management bit associated with the sector indicates a bad sector, is similar to the phantom read operation performed in the one data wedge per header embodiment of sectoring circuit 22 described above, and is specifically described related to this multiple data wedge per header embodiment below.

When the sector having a count value matching the microprocessor offset value is not a bad sector, sectoring circuit 290 signals read/write circuitry 36 to activate either a read gate signal or a write gate signal to enable correspondingly either reading or writing of the matched sector, as indicated at block 310. As described above in reference to sectoring circuit 22, read/write circuitry 36 generates a bit clock, or read reference clock, output signal which is synchronized to the rotation rate of the data storage disc during read operations and to the write frequency during write operations. The bit clock output signal is provided to sectoring circuit 290 so that a byte counter therein (shown in FIG. 9) will accurately count the bytes being written to or read from the data storage disc. As indicated at block 314, synchronizing byte detection circuitry such as that shown in FIG. 5 for sectoring circuit 22, detects a special pattern in the NRZ format signal to indicate where the byte boundaries are located.

Once sectoring circuit 290 signals read/write circuitry 36 to activate either the read gate signal or the write gate signal, sectoring circuit 290 waits for an offset equal signal generated by the sectoring circuit, to become active, as indicated at decisional block 316. The offset equal signal is active when the number of bytes that have been read or written are equal to the number of bytes contained in the sector or sector fragment that is being read from or written to. Once the offset equal signal is activated, sectoring circuit 290 needs to ascertain whether the sector that has been written to or read from is the last sector for the associated data wedge, as indicated at decisional block 318. If the sector that has been written to or read from is not the last sector, sectoring circuit 290 processes errors in the data field by performing error detection and correction on the data field for that sector based on an ECC corresponding to the data field, as indicated at block 320. As indicated by decisional block 321, after performing the error detection and correction, sectoring circuit 290 determines whether or not the desired number of sectors to be transferred for the given write or read operation, as specified by microprocessor 46, have been written or read. If the number of sectors specified by microprocessor 46 have not been written or read, the next sector in the data wedge is handled similar to the previous sector, as indicated by the branch from decisional block 321 back to decisional block 306. If the number of sectors specified by microprocessor 46 have been written or read, then, as indicated at block 323, the given transfer operation is complete.

If, at decisional block 318, the sector being written to or read from was the last sector of the data wedge, then sectoring circuit 290 needs to ascertain whether that last sector was a complete sector or a fraction of a sector, as indicated at decisional block 322. If the last sector is found in decisional block 322 to be a complete sector, then, as indicated by block 324, sectoring circuit 290 processes errors in the data field by performing error detection and correction on the data field for that sector. If the last sector is a fraction of a sector (a non-complete sector), then that sector will be split over at least two adjacent data wedges. Thus, if the last sector is a noncomplete sector, sectoring circuit 290 needs to know whether this last noncomplete sector was the last fragment of a split sector, as indicated at decisional block 325. If this last sector fragment was not the last fragment of a split sector, then, as indicated by block 326, the ECC calculation for the data field for the split sector is supended until the next sector fragment is written or read for the given sector. This suspension can be over one or more servo pattern detections and over zero or more headers. If this last sector fragment was the last fragment of a split sector, then sectoring circuit 290 processes errors in the data field by performing error detection and correction on the data field for the complete sector, as indicated by block 324. The last sector fragment can only be the last fragment of a split sector for the special case where there is less than one sector in the data wedge. In other words, such a sector fragment is both the first and last sector fragment in the data wedge.

As indicated at decisional block 327, sectoring circuit 290 determines whether the last sector of the current data wedge was the last sector to be transferred for the given write or read operation. If the last sector was the last sector to be transferred, as indicated at block 323, the transfer is complete. When the last complete sector was not the last sector to be transferred, sectoring circuit 290 branches to the state indicated at decisional block 328. Sectoring circuit 290 also branches to the state indicated at decisional block 328 from the state indicated at block 326.

Decisional block 328 indicates that sectoring circuit 290 needs to ascertain whether the data wedge that has been written to or read from is the last data wedge for the assiated header. If the data wedge that has been written to or read from is not the last data wedge, then, as indicated at block 330, sectoring circuit 290 waits for the next servo pattern to be detected by transducer head 30. After the next servo pattern is detected at block 330, sectoring circuit 290 branches back to the state indicated at decisional block 306 to handle the next sector to be written to or read from the data storage disc. If, at decisional block 328, the data wedge being written to or read from was the last data wedge associated with the header, then sectoring circuit 290 increments the target identification field first provided by microprocessor 46 considered as a binary number, as indicated at block 329. The target identification field is incremented because sectoring circuit 290 as described below, uses the same addressing scheme as sectoring circuit 22 wherein the target identification field and a sector offset into the current data wedge specifes the desired sector and wherein the header identification fields are continuous. Sectoring circuit 290 then returns to the initial state of the sectoring circuit indicated at decisional block 300 to wait for the next servo pattern to be detected by transducer head 30.

If the desired sector does not match the sector to be written to or read from, at decisional block 306, or if there is a bad matched sector, at decisional block 308, sectoring circuit 290 performs a phantom read, as indicated at block 332, because the sector having the current count value is a bad sector or has not been matched. When the desired sector does not match the sector to be written to or read from at decision block 306, sectoring circuit 290 performs the phantom read to proceed to the next sector location. When the defect management bits indicate that the sector having a count value matching the incroprocessor offset value is a bad sector at decisional block 308, sectoring circuit 290 performs the phantom read so that the bad sector will not be written to or read from. The phantom read is performed by waiting for the offset equal signal to become active indicating that transducer head 30 has moved over the number of bytes that would have been stored in the unmatched or bad sector location, as indicated at decisional block 334. Similar to decisional block 318, a decisional block 336 indicates that sectoring circuit 290 needs to ascertain whether the phantom read was performed over the last sector of the associated data wedge. If the phantom read was not performed over the last sector, then the NO output of decisional block 336 indicates that sectoring circuit 290 returns to the state indicated at the input of decisional block 306 to compare the new sector count with the sector offset value. If the phantom read was performed over the last sector, then the YES output of decisional block 336 indicates that sectoring circuit 290 branches to the state indicated at decisional block 328 to determine if the last sector was written to or read from the last data wedge associated with the header.

A partial block diagram of sectoring circuit 290 is illustrated in FIG. 9. Sectoring circuit 290 is similar in many aspects to sectoring circuit 22 illustrated in block diagram form in FIGS. 5 and 6. Thus, for clarity, the description that follows related to the block diagram illustration of FIG. 9 represents only the interaction of the control circuitry with the registers and counters required to produce the control signals necessary for performing the first method of handling a multiple data wedge per header formatted data storage disc according to the present invention. For example, the defect management circuitry of sectoring circuitry 298 is not shown in FIG. 9, but is representatively illustrated and described in reference to defect management register 168, current sector counter 174, and comparator 205 of sectoring circuit 22 in connection with FIGS. 5 and 6. In addition, the NRZ format signal containing the header and the data field on line 150 and the servo signal on line 152 from read/write circuitry 36 are not shown in FIG. 9, but are representatively illustrated in FIG. 5.

A current data wedge counter 338 provides a current data wedge count on parallel data path 344 which is a binary representation of the current data wedge currently being written to or read from, and one assoiated with the most recently read header. Reset interconnection line 340 of current data wedge counter 338 is activated with the receipt of a header which resets the current data wedge count on path 344 to zero. The receipt of every servo signal from read/write circuitry 36 activates input interconnection line 342 of the current data wedge counter 338 to signal the data wedge counter to increment the data wedge count by one count.

A total data wedge register 346 stores a total data wedge field obtained from the current header which is a binary representation of the total number of data wedges associated with the current header. The total data wedge field is loaded into total data wedge register 346 from parallel data path 348 with the receipt of a new header which activates load interconnection line 350 to enable loading of data into total data wedge register 346. Total data wedge register 346 provides the total data wedge field to a comparator 354 on a parallel data path 352. The current data wedge count provided on parallel data path 344 is also provided to comparator 354. Comparator 354 provides a last wedge signal on interconnection line 356 which is active when the current data wedge count on path 344 matches the total data wedge field value on path 352.

A target identification (ID) register 357 stores the three byte target identification field indicated above that is provided from microprocessor 46. As described above, in reference to sectoring circuit 22, the target identification field is compared to the header identification field read from the header. The last wedge signal on line 356 is provided to target ID register 357. When the last wedge signal is active, the target identification field stored in target ID register 357 considered as a binary number is incremented.

A total sector fields register 358 stores a total sector field obtained from the current header for each data wedge associated with the current header. The total sector field for each data wedge is a binary representation of the total number of sectors contained in the associated data wedge. The total sector fields associated with the current header are loaded into total sector field register 358 from parallel data path 360 upon the receipt of the header which activates load interconnection line 362 to enable loading of data into the total sector field register. The current data wedge count is provided to total sector fields register 358 on parallel data path 344 from current data wedge counter 338 to date which of the total sector fields stored in total sector fields register 358 is identified with the current data wedge. Total sector field register 358 provides the total sector field identified with the current data wedge on parallel data path 364.

A current sector counter 366 stores a current sector count which is a binary representation of the number of sectors of the current data wedge which have been written or read. Reset interconnection line 368 of current sector counter 366 is activated by the receipt of the servo signal from read/write circuitry 36 which resets the current sector count stored in current sector counter 366 to zero. The completion of writing to or reading from any sector activates input interconnection line 370 of current sector counter 366 to cause the current sector counter to increment the current sector count by one count. Current sector counter 366 provides the current sector count on parallel data path 372 to a comparator 374. Comparator 374 compares the current sector count on path 372 with the total sector field identified with the current data wedge on path 364 to provide a last sector signal on line 376. The last sector signal on interconnection line 376 is active when the total sector field of the current data wedge on path 364 matches the current sector count on path 372. Comparator 374 also provides an enable second offset signal on interconnection line 377 which is active when the current sector count on path 372 is one less than the number represented by the total sector field of the current data wedge on path 364.

A sector size register 378 stores a sector size value which is a binary representation of the number of bytes contained in a complete sector. The sector size is typically loaded from microprocessor 46 prior to the transfer operation. A byte counter 380 stores a current byte count, considered as a binary number representative of the number of bytes of the current sector being written to or read from the data storage disc. Reset interconnection line 381 of byte counter 380 is activated by the completion of writing to or reading from any sector which resets the current byte count stored in byte counter 380 to zero. The operation of byte counter 380 is similar to the operation of byte counter 184 of sectoring circuit 22 described previously in connection with FIGS. 5 and 6. Thus, for clarity, the synchronizing byte detection circuitry and byte clock generator circuitry necessary for the operation of byte counter 380 to detect byte boundaries in the NRZ format data signal are not shown in FIG. 9, but are representatively illustrated and described in reference to the similar synchronizing byte detection circuitry 188 and byte clock generator 190 of sectoring circuit 22 in connection with FIGS. 5 and 6. Byte counter 380 provides the current byte count on parallel data path 382 to a comparator 384. The sector size value stored in sector size register 378 is provided on parallel data path 386 to comparator 384. Comparator 384 compares the byte count on path 382 with the sector size value on path 386 to provide a complete sector equal signal on interconnection line 388. The complete sector equal signal on line 388 is active when the byte count on path 382 matches the sector size value on path 386.

A first offset register stack 390 stores first offset information from the header information in byte pairs, such that each byte pair is identified with a separate data wedge associated with the current header. A byte pair of first offset information represents the number of bytes of a split seetor remaining from the previous data wedge to be written to or read from the current data wedge. The first offset information is loaded into first offset register stack 390 from parallel data path 392 with the receipt of a new header which activates load interconnection line 394 to enable loading of information into first offset register stack 390. First offset register stack 390 contains individual registers for each byte pair. Therefore, the number of individual registers in first offset register stack 390 is equal to the maximum number of data wedges that can be associated with one header (representatively illustrated in FIG. 9 as WEDGE 0 through WEDGE N). The current data wedge count from current data wedge counter 338 is provided on parallel data path 344 to first offset register stack 390 to designate the individual register in first offset register stack 390 storing the byte pair that is identified with the current data wedge associated with the current header.

The first offset information for the current data wedge is provided on parallel data path 398 to a comparator 400. Comparator 400 compares the current byte count on path 382 from byte counter 380 with the first offset information for the current data wedge on path 398. Comparator 400 activates interconnection line 402 when the byte count on path 382 is equal to the number of bytes represented by the first offset information for the current data wedge on path 398. Current sector counter 366 provides the current sector count to zero detect circuit 404 on parallel data path 372. Zero detect circuit 404 detects when the current sector count is zero, to thereby indicate that the sector which is currently being written to or read from is the first sector of the data wedge. Zero detect circuit 404 activates an enable signal to comparator 400 on enable interconnection line 406 when the current sector count is zero to enable a comparison between the number of bytes represented by the byte count on path 382 and the number of bytes represented by the first offset value on path 398.

A second offset register stack 408 stores second offset information from the header information in byte pairs, such that each byte pair is identified with a separate data wedge associated with the current header. A byte pair of second offset information represents the number of bytes of a sector split between the current data wedge and the next data wedge which are to be written to or read from the current data wedge. The second offset information is loaded into second offset register stack 408 from parallel data path 410 with the receipt of a new header which activates load interconnection line 412 to enable loading of information into second offset register stack 408. Second offset register stack 408 contains individual registers for each byte pair. Therefore, the number of individual registers in second offset register stack 408 is equal to the maximum number of data wedges that can be associated with one header (representatively illustrated in FIG. 9 as WEDGE 0 through WEDGE N). The current data wedge count from current data wedge counter 338 is provided on path 344 to second offset register stack 408 to designate the individual register in second offset register stack 408 storing the byte pair that is identified with the current data wedge associated with the current header.

Since the second offset information represents the number of bytes of a sector split between the current data wedge and the next data wedge which are to be written to or read from the current data wedges, only one of either the first offset information or the second offset information is needed for WEDGE 1 through WEDGE N-1. This is because one of either the first or second offet values is redundant information contained in the header for WEDGES 1 through N-1 because the sector size is already stored in sector size register 378 and WEDGE 1 through WEDGE N-1 are not split between headers. The first offset value could be obtained by subtracting the previous data wedge's second offset value from the sector size. Similarly, the second offset value could be obtained by subtracting the net data wedge's first offset value from the sector size. Thus, the header size could be reduced by adding additional circuitry to sectoring circuit 290 to calculate the missing offset values associated with a given header based on the offset values contained in the given header and the sector size.

The second offset information for the current data wedge is provided on parallel data path 414 to a comparator 416. Comparator 416 is enabled by comparator 374 activating the enable second offset signal on line 377. Comparator 416 compares the current byte count on path 382 from byte counter 380 with the second offset information for the current data wedge on path 414. Comparator 416 activates interconnection line 418 when the enable second offset signal on line 377 is active, and the byte count on line 382 is equal to the number of bytes represented by the second offset information for the current data wedge on line 414. An OR gate 420 receives the output of comparator 416 on line 418 and the output of comparator 400 on line 402, and provides a split sector equal signal on interconnection line 422. The split sector equal signal on line 422 is active when either line 418 or line 402 is active. An OR gate 424 receives the split sector equal signal on line 422 and the complete sector equal signal on line 388 to provide an offset equal signal on interconnection line 426. The offset signal on line 426 is active when either the complete sector equal signal on line 388 is active or the split sector equal signal on line 422 is active.

Sectoring circuit 290 provides the last sector signal on line 376 at the output of comparator 374, which corresponds to decisional block 318 of the flow diagram of FIG. 8, to indicate whether or not the last sector of the data wedge has been written to or read from. Sectoring circuit 290 provides the complete sector equal signal on line 388 at the output of comparator 384, which corresponds to decisional block 322 of the flow diagram of FIG. 8, to indicate when a complete sector has been written to or read from. Sectoring circuit 290 also provides the offset equal signal on line 426 at the output of OR gate 424, which corresponds to block 316 of the flow diagram of FIG. 8, to indicate when all the bytes of a complete sector or all the bytes of a split sector which are contained in the current data wedge are written to or read fronl In addition, sectoring circuit 290 provides the last wedge signal on line 356 at the output of comparator 354, which corresponds to decisional block 328 of the flow diagram of FIG. 8, to indicate when the last data wedge associated with the current header has been written to or read from.

Figure 10:
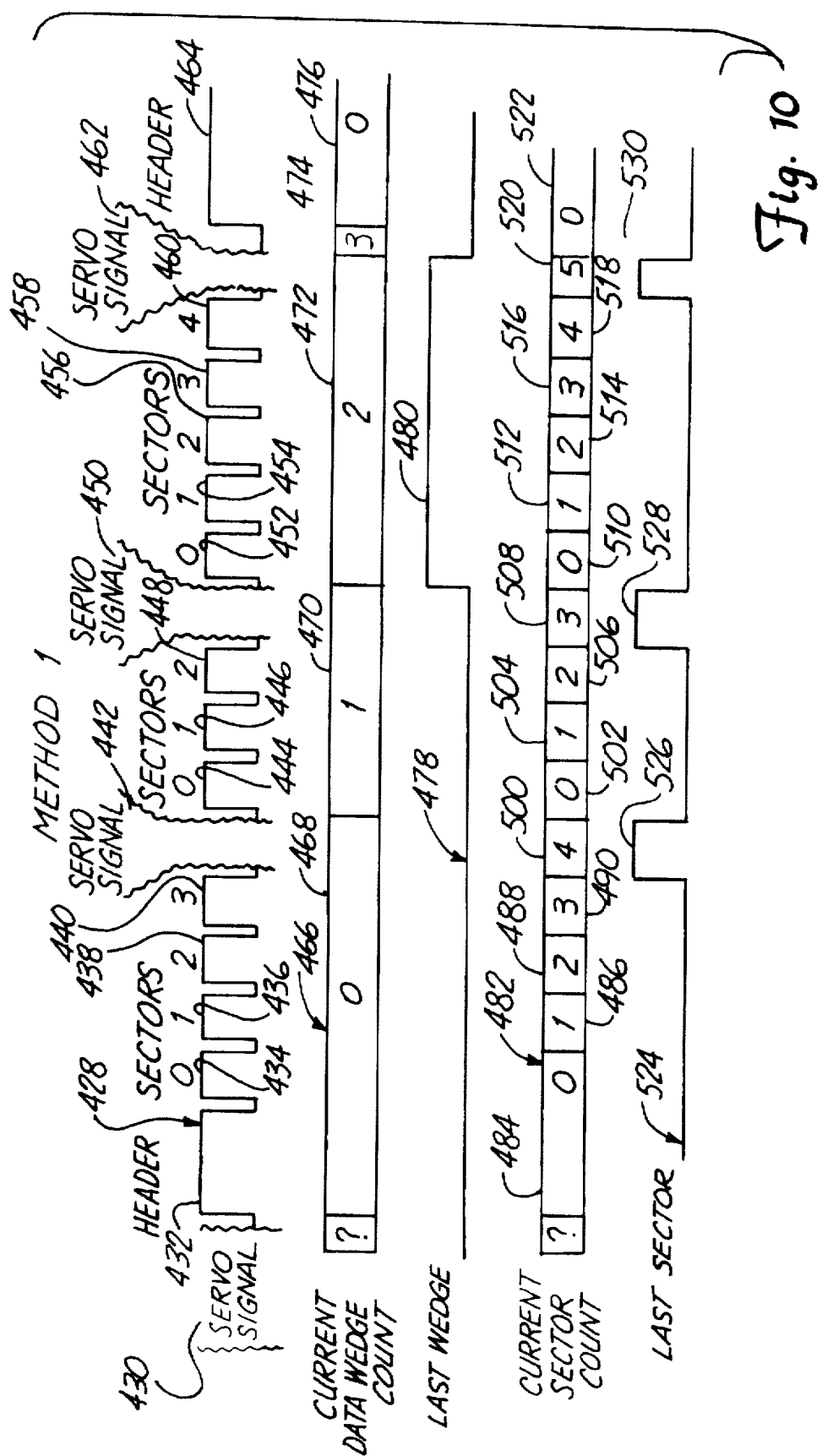
FIG. 10 is a timing diagram illustrating the operation of the sectoring circuit of FIG. 9.

An example of the first method of handling a multiple data wedge per header case is illustrated in timing diagram form in FIG. 10. An illustrated waveform 428 shows the waveform of the NRZ format signal contaiing the header information and sector data field information from read/write circuitry 36 as interrupted by the receipt of the servo signals from read/write circuitry 36. As illustrated, a first servo signal portion is received at time point 430 and a first header is received over the NRZ format signal at time point 432. The sector zero data for the first data wedge is received at time point 434. The sector one data for the first data wedge is received at time point 436. The sector two data for the first data wedge is received at time point 438. The sector three data for the first data wedge is received at time point 430. A second servo signal portion is received at time point 442 For the second data wedge, sector zero is received at time point 444, sector one is received at time point 446, and sector two is received at time point 448. A third servo signal portion is received at tim point 450. For the third data wedge, sector zero is received at time point 452, sector one is received at time point 454, sector two is received at time point 456, sector three is received at time point 458, and sector four is received at time point 460. A fourth servo signal portion is received at time point 462 and followed by the receipt of a second header at time point 464. Thus, in this example, sectoring circuit 290 receives 12 sectors associated with the header received at time point 432, which are split into three data wedges. The first and second data wedges are separated by the servo signal portion at time point 442 and the second and third data wedges are separated by the servo signal portion at ime point 450.

The current data wedge count provided by current data wedge counter 338 is represented in FIG. 10 as counter contents 466 that change over time. With the receipt of the first header at time point 432, the current data wedge count is reset to zero, as indicated at contents time point 468. After the secondservo signaportion is received at te point 442 to indicate that the first data wedge has been received, current data wedge counter 328 increments the data wedge count to a one, as indicated at contents time point 470. After the third servo signal is received at time point 450, current data wedge counter 338 increments the current data wedge count to a two as indicated at contents time point 472. After the receipt of the fourth servo signal at time point 462, current data wedge counter 338 increments the current data wedge count to a three as indicated at contents time point 474. With the receipt of the second header at 464, the current data wedge count is reset to zero.

The value of the last wedge signal provided on line 356 is indicated by waveform 478. As indicated, the last wedge signal is active at time point 480 when current data wedge counter 338 increments the current data wedge count to a two at contents time point 472, which corresponds to when the current wedge count is equal to the total data wedge number stored in total data wedge register 346.

The current sector count provided by current sector counter 366 is represented in FIG. 10 as counter contents 482 that change over time. With the receipt of the first servo signal portion at time point 430, the current sector count is reset to zero as indicated at contents time point 484. After sector zero of the first data wedge is received at time point 434, current sector counter 366 increments the current sector count to a one, as indicated at contents time point 486. After sector one of the first data wedge is received at time point 436, the current sector count is incremented to a two, as indicated at contents time point 488. likewise, after the receipt of sector two of the first data wedge at time point 438, the current sector count is incremented to a three, as indicated at contents time point 490, and after the receipt of sector three at time point 440, the current sector count is incremented to a four, as indicated at contents time point 500. With receipt of the sed servo signal portion at time point 442, the current sector count is reset to zero as indicated at contents time point 502. In a likewise manner, as the second data wedge sectors are received at time points 444, 446, and 448, the current sector count is respectively incremented to a one at contents time point 504, to a two at contents time point 506, and to a three at contents time point 508. With the receipt of the third servo signal portion at time point 450, the current sector count is again reset to zero, as indicated at contents time point 510. With the receipt of the third data wedge sectors at time points 453, 454, 456, 458, and 460, the current sector count is respectively incremented to a one at contents time point 512 to a two at contents time point 514, to a three at contents time point 516, to a four at contents time point 518, and to a five, at contents time point 520. With the receipt of the fourth servo signal portion at time point 462, the current sector count is reset to zero, as indicated at contents time point 522.

The value of the last sector signal provided on line 376 is indicated by waveform 524. As indicated, the last sector signal on line 376 is active at time point 526 when the current sector count is incremented to a four at contents time point 500, which corresponds to when the current sector count is equal to the total number of sectors represented by the first total sector field for the first data wedge stored in total sector fields register 358. Similarly, the last sector signal on line 376 is active at time point s28 when the current sector count is incremented to a three at contents time point 508 to match the total number of sectors represented by the total sector field for the second data wedge stored in total sector register 358. The last sector signal is also active at time point 530 when the current sector count is incremented to a five at contents time point 520 to match the total number of sectors represented by the total sector field for the third data wedge stored in total sector register 358.

Multiple Data Wedge Per Header (Method 2)

Figure 11:
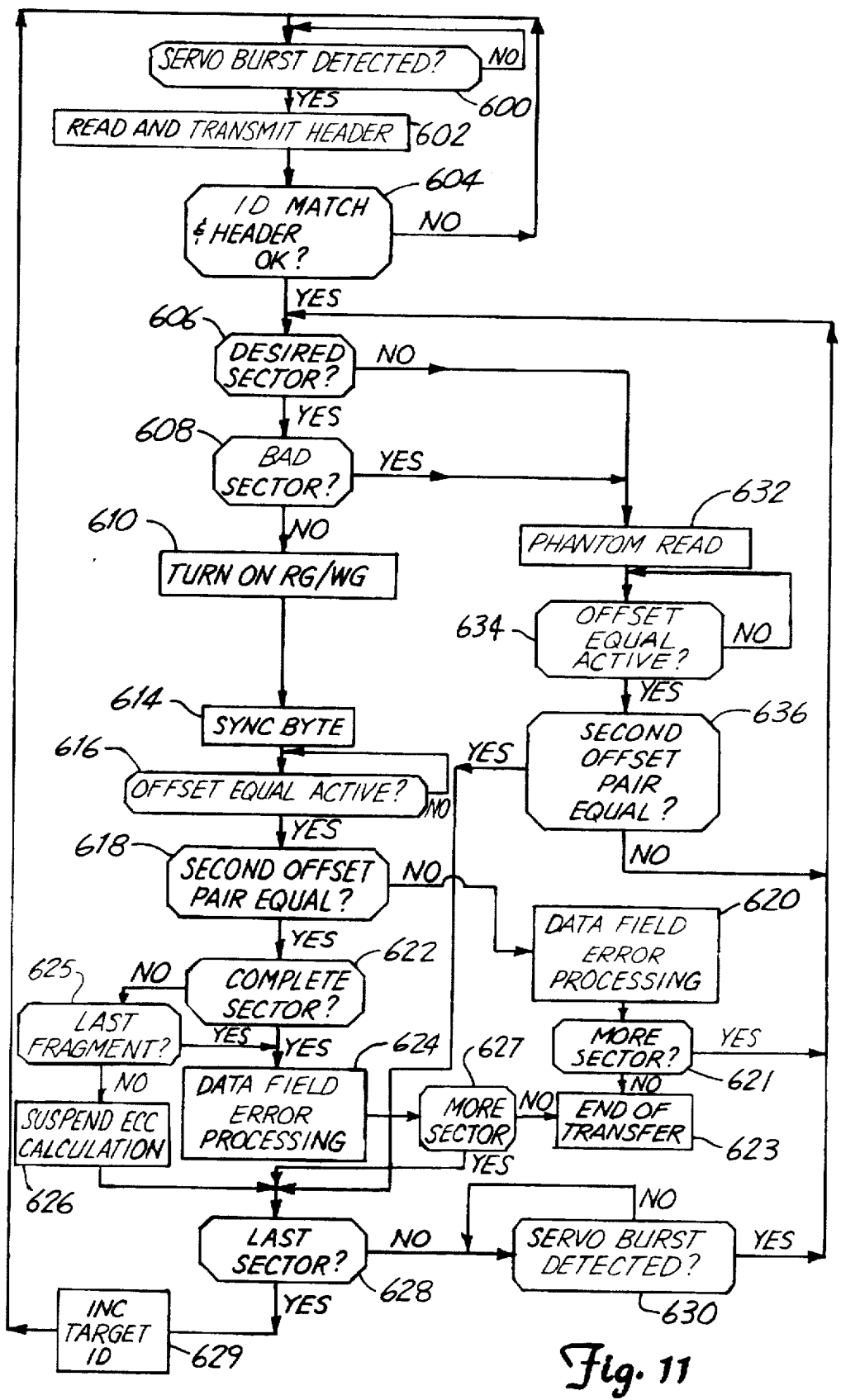
FIG. 11 is a multiple data wedge per header read/write map flow chart of another embodiment of the present invention.
Figure 12:
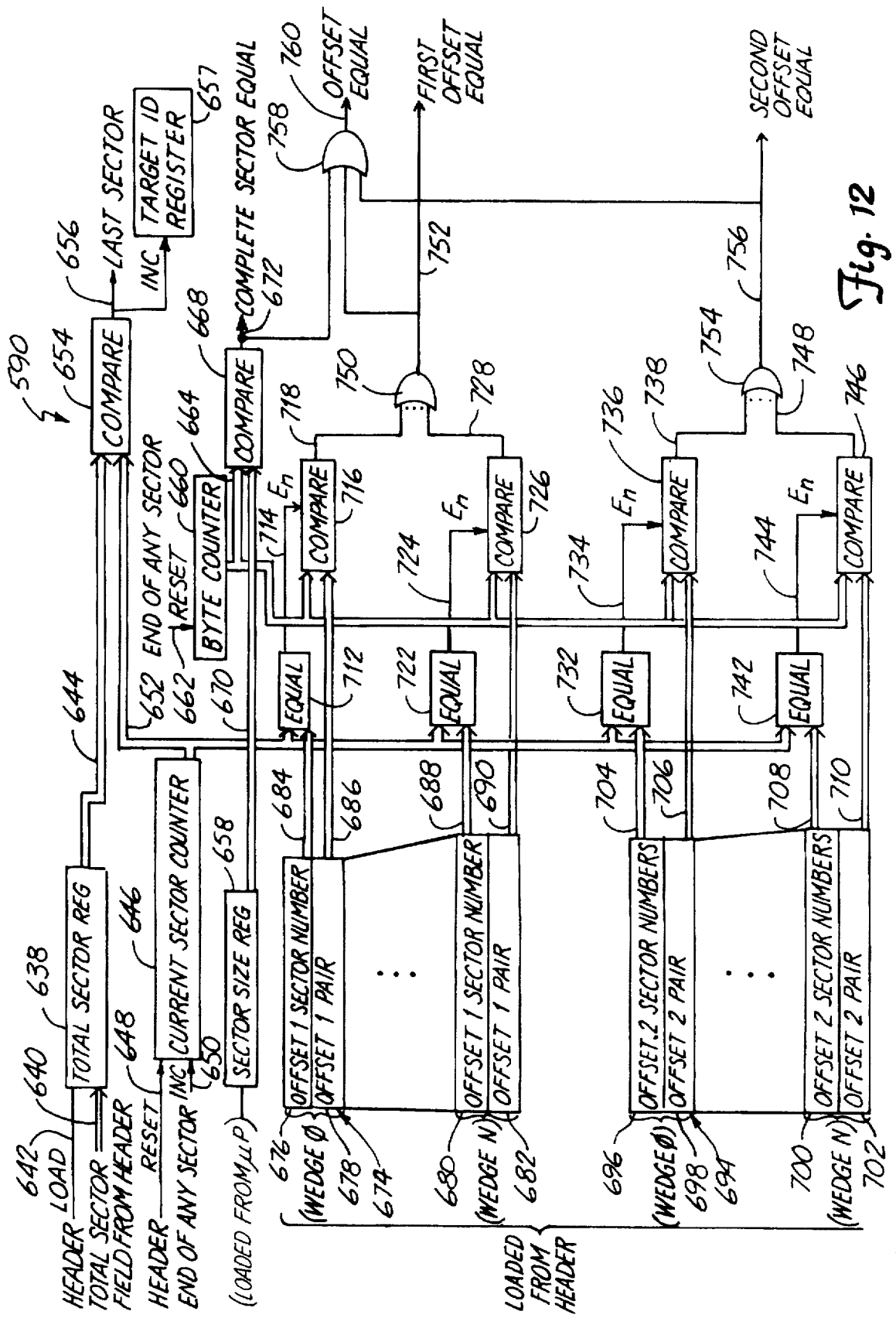
FIG. 12 is a block diagram of a sectoring circuit for the multiple data wedge per header embodiment of FIG. 11.

Another preferred embodiment of the present invention for locating data sectors in a data storage disc (not shown) which is formatted so that there are multiple data wedges associated with a single header is embodied in a sectoing circuit 590 (illustrated in block diagram form FIG. 12). Referring to FIG. 11, a read/write map flow chart corresponding to sectoring circuit 590 illustrates a second method of handling a storage disc formatted with multiple data wedges per header according to the present invention The algorithm of FIG. 11 starts at decisional block 600. At decisional block 600, read/write circuitry 36 waits for transducer bead 30 to detect a servo pattern on the data storage disc. Once transducer head 30 detects the servo pattern, transducer head 30 provides a burst of servo pattern magnetically caused voltage pulses, which have a lower frequency than the data, to read/write circuitry 36. Read/write circuitry 36 then reads the header associated with the most recent servo pattern, as indicated at block 602. Also at block 602, read/write circuitry 36 provides header information to sectoring circuit 590.

Decisional block 604 indicates that sectoring circuit 590 compares a three byte header identification field from the most recently read header with a three-byte target identification field provided by microprocesor 46. If the header identification field does not match the target identification field, then read/write circuitry 36 again waits for transducer head 30 to detect the next servo pattern on the data storage disc, as indicated by the branch from decisional block 604 back to decisional block 600. Also at decisional block 604, sectoring circuit 590 processes errors in the header by performing error detection and correction on the header based on an ECC corresponding to the header. If the header information contains errors that were not corrected by the header error processing, the read/write circuitry 36 again waits for transducer head 30 to detect the next servo pattern on the data storage disc, as indicated by the branch from decisional block 604 back to decisional block 600.

If the header identification field matches the target identification field to indicate that the most recently read header is associated with the desired sector then, as indicated at decisional block 606, sectoring circuit 590 compares a sector offset value provided by microprocessor 46 to a current sector count provided by a current sector counter (shown in FIG. 12). The sector offset value represents where the desired sector is located in the current data wedge. The current sector count indicates the number of sectors of the current data wedge which have been written or read. If the current sector count is found to match the sector offset value in decisional block 606, decisional block 608 then indicates whether bad sectors, as indicated by the defect management bits associated with the header, need to be sldpped over. The operation performed if the desired sector is not matched, or if the defect management bit associated with the sector indicates a bad sector, is similar to the phantom read operation performed in the one data wedge per header emboiment of sectoring circuit 22 descnbed above, and is specifically described related to this multiple data wedge per header embodiment below.

When the sector having a count value matching the microprocesor offset value is not a bad sector, sectoring circuit 590 signals read/write circuitry 36 to activate either a read gate signal or a write gate signal to enable correspondingly either reading or writing of the matched sector, as indicated at block 610. As described above in reference to sectoring circuit 22, read/write circuitry 36 generates a bit clock, or read reference clock, output signal which is synchronized to the rotation rate of the data storage disc during read operations and to the write frequency during write operations. The bit clock output signal is provided to sectoring circuit 590 so that a byte counter therein (shown in FIG. 12) will accurately count the bytes being written to or read from the data storage disc. As indicated at block 614, synchronizing byte detection circuitry, such as that shown in FIG. 5 for sectoring circuit 22, detects a special pattern in the NRZ format signal to indicate where the byte boundaries are located.

Once sectoring circuit 590 signals read/write circuitry 36 to activate either the read gate or the write gate signal, sectoring circuit 590 waits for an offset equal signal generated by the sectoring circuit, to become active, as indicated at decisional block 616. The offset equal signal is active when the number of bytes that have been read or written are equal to the number of bytes contained in the sector or sector fragment that is being read from or written to. Once the offset equal signal is activated at decisional block 616, sectoring circuit 590 needs to ascertain whether a second offset equal signal is active at decisional block 618. The second offset equal signal is activated when the sector or sector fragment that has been written to or read from is the last sector for the associated data wedge and the number of bytes that have been read or written are equal to the number of bytes contained in the last sector or sector fragment, as indicated at decisional block 618.

If, at decisional block 618, the second offset equal signal is not active, the sector that has been written to or read from is not the last sector and sectoring circuit 590 processes errors in the data field by performing error detection and correction on the data field for that sector based on an ECC corresponding to the data field, as indicated at block 620. As indicated by decisional block 621, after performing the error detection and correction, sectoring circuit 590 determines whether or not the desired number of sectors to be transferred for the given write or read operation, as specified by microprocessor 46, have been written or read. If the number of sectors specified by microprocessor 46 have not been written or read, the next sector in the data wedge is handled similar to the previous sector, as indicated by the branch from decisional block 621 back to decisional block 606. If the number of sectors specified by microprocessor 46 have been written or read, then, as indicated at block 623, the given transfer operation is complete.

If, at decisional block 618, the second offset equal signal is active, indicating that the sector being written to or read from was the last sector of the data wedge, then sectoring circuit 590 needs to ascertain whether that last sector was a complete sector or a fraction of a sector, as indicated at decisional block 622. If the last sector of the data wedge is found in decisional block 622 to be a complete sector, then, as indicated by block 624, sectoring circuit 590 processes errors in the data field by performing error detection and correction on the data field for that sector. If the last sector of the data wedge is a fraction of a sector (a noncomplete sector), then that sector will be split over at least two adjacent data wedges. Thus, if the last sector of the data wedge is a non-complete sector, sectoring circuit 590 needs to know whether this last non-complete sector was the last fragment of a split sector, as indicated at decisional block 625. If this last sector fragment of the data wedge was not the last fragment of a sput setor, then, as indicated by block 626, the ECC calculation for the data feld for the split sector is suspended until the next sector fragment is written or read for the given sector. This suspension can be over one or more servo pattern detections and over zero or more headers. If this last sector fragment of the data wedge was the list fragment of a split sector, then sectoring circuit 590 processes errors in the data field by performing error detectikon and correction on the data field for the complete sector, as indicated by block 624. The last sector frnit of the data wedge can only be the last fragment of a split sector for this specal case where there is less than one sector in the data wedge. In other words, such a sector fragment is both the first and last sector fragment in the data wedge.

As indicated at decisional block 627, sectoring circuit 590 determines whether the last sector of the current data wedge wu the last setor to be transferred for the given write or read operationL If the last sector of the data wedge was the last sector to be transferred, as indicated at blodc 623, the transfer is complete. When the last complete sector of the data wedge was not the last sector to be traderred, sectoring circuit 590 branches to the state indicated at decisional block 628. Sectoring circuit 590 also branches to the state indicated at desional block 628 from the state indicated at block 626.

Decisional block 628 indicates that sectoring circuit 590 needs to ascertain whether the sector that has been written to or read from is the last sector for the associated header. If the sector that has been written to or read fom is not the last sctor for the associated header, then, as indicated at block 630, sectoring circuit 590 waits for the next servo pattern to be detected by transducer head 30. After the next servo pattern is detected at block 630, sectoring circuit 590 branches back to the stated indicated at decisional block 606 to handle the next sector to be written to or read from the data storage disc. If, at decisional block 628, the sector being written to or read from was the last sector associated with the header, then sectoring circuit 590 increments the target identification field first provided by microprocessor 46 considered as a binary number, as indicated at block 629. The target identification field is incremented because sectoring circuit 590, as described below, uses the same addressing scheme as sectoring circuit 22 wherein the target identification field and a sector offset into the current data wedge specifies the desired sector and wherein the header identification fields are continuous. Sectoring circuit 590 then returns to the initial state of the sectoring circuit indicated at decisional block 600 to wait for the next servo pattern to be detected by transducer head 30.

If the desired sector does not match the sector to be written to or read from, at decisional block 606, or if there is a bad matched sector, at decisional block 608, sectoring circuit 590 performs a phantom read, as indicated at block 632, because the sector having the current count value is a bad sector or has not been matched. When the desired sector does not match the sector to be written to or read from at decisional block 606, sectoring circuit 590 performs the phantom read to proceed to the next sector location. When the defect management bits indicate that the sector having a count value matching the microprocessor offset value is a bad sector at decisional block 608, sectoring circuit 590 performs the phantom read so that the bad sector will not be written to or read fromn The phantom read is performed by waiting for the offset equal signal to become active indicating that transducer head 30 has moved over the number of bytes that would have been stored in the unmatched or bad sector location, as indicated at decisional block 634. Similar to decisional block 618, sectoring circuit 590 needs to ascertain whether the second offset equal signal is active, which indicates that the phantom read was performed over the last sector of the associated data wedge, as indicated at block 636. If the second offset equal signal is not active, sectoring circuit 590 returns to the state indicated at the input of decisional block 606 to compare the new sector count with the sector offset value. If the second offset equal signal is active, sectoring circuit 590 branches to the state indicated at decisional block 628 to determine if the sector written to or read from was the last sector associated with the header.

A partial block diagram of sectoring circuit 590 is illustrated in FIG. 12. Sectoring circuit 590 is similar in many aspects to sectoring circuit 22 illustrated in block diagram form in FIGS. 5 and 6. Thus, for clarity, the description that follows related to the block diagram illustration of FIG. 12 represents only the interaction of the control circuitry with the registers and counters required to produce the control signals necessry for performing the second method of handing a multiple data wedge per header formatted data storage disc according to the present invention. For example, the header error detection and correction circuitry and data field error detection and correction circuitry of sectoring circuit 590 is not shown in FIG. 12, but is representatively illustrated and described in reference to the header error detection and correction circuitry in header error processor 182 and the data field error detection and correction circuitry in data field error processor 180 of sectoring circuit 22 in connection with FIG. 5. In addition, the NRZ format signal containing the header and the data field on line 150 and the servo signal on line 152 from read/write circuitry 36 are not shown in FIG. 12, but are representatively illustrated in FIG. 5.

A total sector register 638 stores a total sector field obtained from the current header which is a binary representation of the total number of sectors associated with the current header. The total sector field is loaded into total sector register 638 from parallel data path 640 with the receipt of a new header which activates load interconnection line 642 to enable loading of data into total sector register 638. Total sector register 638 provides the total sector field to a comparator 654 on a parallel data path 644.

A current sector counter 646 stores a current sector count which is a binary representation of the current sector currently being written to or read from, and one associated with the most recently read header. Reset interconnection line 648 of current sector counter 646 is activated with the receipt of a header which resets the current sector count stored in current sector counter 646 to zero. The completion of writing to or reading from any sector activates input interconnection line 650 of current sector counter 646 to cause the current sector counter to increment the current sector count by one counL Current sector counter 646 provides the current sector count on parallel data path 652 to comparator 654. Comparator 654 compares the current sector count on path 652 with the total sector field associated with the current header on path 644 to provide a last sector signal on interconnection line 656. The last sector signal on line 656 is active when the total sector field on path 644 matches the current sector count on path 652.

A target identification (ID) register 657 stores the three byte target identification field indicated above that is provided from microprocessor 46. As described above, in reference to sectoring circuit 22, the target identification field is compared to the header identification field read from the header. The last sector signal on line 656 is provided to target ID register 657. When the last sector signal is active, the target identification field stored in target ID register 657 considered as a binary number is incremented.

A sector size register 658 stores a sector size value which is a binary representation of the number of bytes contained in a complete sector. The sector size is typically loaded from microprocessor 46 prior to the transfer operation. A byte counter 660 stores a current byte count, considered as a binary number representative of the number of bytes of the current sector being written to or read from the data storage disc. Reset interconnection line 662 of byte counter 660 is activated by the completion of writing to or reading from any sector which resets the current byte count stored in byte counter 660 to zero. The operation of byte counter 660 is similar to the operation of byte counter 184 of sectoring circuit 22 described previously in connection with FIGS. 5 and 6. Thus, for clarity, the synchronizing byte detection circuitry and byte clock generator circuitry necessary for the operation of byte counter 660 to detect byte boundaries in the NRZ format data signal are not shown in FIG. 12, but are representatively illustrated and described in reference to the similar synchronizing byte detection circuitry 188 and byte clock generator 190 of sectoring circuit 22 in connection with FIGS. 5 and 6. Byte counter 660 provides the current byte count on parallel data path 664 to a comparator 668. The sector size value stored in sector size register 658 is provided on parallel data path 670 to comparator 668. Comparator 668 compares the byte count on path 664 with the sector size value on path 670 to provide a complete sector equal signal on interconnection line 672. The complete sector equal signal on line 672 is active when the byte count on path 664 matches the sector size value on path 670.

A first offset register stack 674 stores first offset information from the header information in byte pairs, such that each byte pair is identified with a separate data wedge associated with the current header. A byte pair of first offset information represents the number of bytes of a split sector remaining from the previous data wedge to be written to or read from the current data wedge. First offset register stack 674 also stores a first offset sector number for each byte pair. The first offsector numbers represent the first sectors of the data wedges associated with the current header. The first offset information and the first offset sector numbers are loaded into first offset register stack 674 from the associated header. First offset register stack 674 contains individual registers for each byte pair, and matching individual registers for the first offset numbers associated with the byte pars. Therefore, the number of individual registers in first offset register stack 674 is equal to the maximum number of data wedges that can be associated with one header (representatively illustrated in FIG. 9 as WEDGE 0 through WEDGE N). As representatively illustrated, the first offset byte pair for WEDGE 0 is stored in register 678, and the first offset number for WEDGE 0 is stored in register 676. The first offset byte pair for WEDGE N is stored in register 62, and the first offset number for WEDGE N is stored in register 680.

The current sector count from current sector counter 646 is provided on parallel data path 652 to equal logic circuit 712. The first offset number for WEDGE 0 from register 676 is also provided to equal logic circuit 712 on parallel data path 684. Equal logic circuit 712 provides an enable to a comparator 716 on enable interconnection line 714 when the first offset number for WEDGE 0 matches the current sector count provided on path 652. The first offset byte pair for WEDGE 0 is provided from register 678 on parallel data path 686 to comparator 716. Comparator 716 compares the current byte count on path 664 from byte counter 660 with the first offset information for WEDGE 0 on path 686 when enable line 714 is active. Comparator 716 activates interconnection line 718 when the byte count on path 664 is equal to the number of bytes represented by the first offset information for WEDGE 0 on path 686 when line 714 is active.

The current sector count from current sector counter 646 is provided on path 652 to equal logic circuit 722. The first offset number for WEDGE N from register 680 is also provided to equal logic circuit 722 on parallel data path 688. Equal logic circuit 722 provides an enable to a comparator 726 on enable interconnection line 724 when the first offset number for WEDGE N matches the current sector count provided on path 652. The first offset byte pair for WEDGE N is provided from register 682 on parallel data path 690 to comparator 726. Comparator 726 compares the current byte count on path 664 from byte counter 660 with the first offset information for WEDGE N on path 690 when enable line 724 is active. Comparator 726 activates interconnection line 728 when the byte count on path 664 is equal to the number of bytes represented by the first offset information for WEDGE N on path 690 when line 724 is active.

An OR gate 750 receives the output of all of the comparators performing the first offset pair compares for WEDGES 0 through N, such as represented by comparator 716 (WEDGE 0) and comparator 726 (WEDGE N) to provide a first offset equal signal on interconnection line 752. The first offset equal signal on line 752 is active when any of these comparators activate its associated output line such as if either line 718 (WEDGE 0) or line 728 (WEDGE N) is activated.

A second offset register stack 694 stores second offset information from the header information in byte pairs. such that each byte pair is identified with a separate data wedge associated with the current header. A byte pair of second offset information represents the number of bytes of a sector split between the current data wedge and the next data wedge which are to be written to or read from the current data wedge. Second offset register stack 694 also stores a second offset sector number for each byte pair. The second offset sector numbers represent the last sectors of the data wedges associated with the current header. The second offset information and the second offet sector numbers are loaded into second offset register stack 694 from the assoiated header. Second offset register stack 694 contains individual registers for each byte pair, and matching individual registers for the second offset numbers associated with the byte pairs. Therefore, the number of individual registers in second offset register stack 694 is equal to the maximum number of data wedges that can be associated with one header (representatively illustrated in FIG. 9 as WEDGE 0 through WEDGE N). As representatively mustrated, the second offset byte pair for WEDGE 0 is stored in register 698, and the second offset number for WEDGE 0 is stored in register 696. The second offset byte pair for WEDGE N is stored in register 702, and the second offset number for WEDGE N is stored in register 700.

Similar to sectoring circuit 290 described above, sectoring circuit 590 needs only one of either the first offset information or the second offset information for WEDGE 1 through WEDGE N-1. This is becuse one of either the first or second offset information is redundant information contained in the header for WEDGES 1 through N-1 because the sector size is already stored in sector size register 658 and WEDGE 1 through WEDGE N-1 are not split between headers. The first offset byte pair could be obtained by subtracting the previous data wedge's second offset byte pair value from the sector size. Similarly, the second offset byte pair could be obtained by subtracting the next data wedge's first offset byte pair value from the sector size. Thus, the header size could be reduced by adding additional circuitry to sectoring circuit 590 to calculate the missing offset values associated with a given header based on the offset values contained in the given header and the sector size.

The current sector count from current sector counter 646 is provided on path 652 to equal logic circuit 732. The second offset number for WEDGE 0 from register 696 is also provided to equal logic circuit 732 on parallel data path 704. Equal logic circuit 732 provides an enable to a comparator 736 on enable interconnection line 734 when the second offset number for WEDGE 0 matches the current sector count provided on path 652. The second offset byte pair for WEDGE 0 is provided from register 698 on parallel data path 706 to comparator 736. Comparator 736 compares the current byte count on path 664 from byte counter 660 with the second offset information for WEDGE 0 on path 706 when enable line 734 is active. Comparator 736 activates interconnection line 738 when the byte count on path 664 is equal to the number of bytes represented by the second offset information for WEDGE 0 on path 706 when line 734 is active.

The current sector count from current sector counter 646 is provided on path 652 to equal logic circuit 742. The second offset number for WEDGE N from register 700 is also provided to equal logic circuit 742 on parallel data path 708. Equal logic circuit 742 provides. an enable to a comparator 746 on enable interconnection line 744 when the second offset number for WEDGE N matches the current sector count provided on path 652. The second offset byte pair for WEDGE N is provided from register 702 on parallel data path 710 to comparator 746. Comparator 746 compares the current byte count on path 664 with the second offset information for WEDGE N on path 710 when enable line 744 is active. Comparator 746 activates interconnection line 748 when the byte count on path 664 is equal to the number of bytes represented by the second offset information for WEDGE N on path 710 when line 744 is active.

An OR gate 754 receives the output of all of the comparators performing the second offset pair compares for WEDGES 0 through N, such as represented by comparator 736 (WEDGE 0) and 746 comparator (WEDGE N) to provide a second offset equal signal on interconnection line 756. The second offset equal signal on line 756 is active when any of these comparators activate its associated output line such as if either line 738 (WEDGE 0) or line 748 (WEDGE N) is activated.

An OR gate 758 receives the first offset equal signal on line 752, the second offset equal signal on line 756, and the complete sector equal signal on line 672 to provide an offset equal signal on interconnection line 760. The offset equal signal on line 760 is active when the first offset equal signal on line 752 is active, the second offset equal signal on line 756 is active, or the complete sector equal signal on line 672 is active.

Sectoring circuit 590 provides the second offset equal signal on line 756 at the output of OR gate 754, which corresponds to decisional block 618 of the flow diagram of FIG. 11, to indicate whether or not all of the bytes contained in the current data wedge of the last sector of the data wedge which are contained in the current data wedge have been written to or read from. Sectoring circuit 590 provides the complete sector equal signal on line 672 at the output of comparator 668, which corresponds to decisional block 622 of the flow diagram of FIG. 11, to indicate when a complete sector has been written to or read from. Sectoring circuit 590 also provides the offset equal signal on line 760 at the output of OR gate 758, which corresponds to block 616 of the flow diagram of FIG. 11, to indicate when all the bytes of a complete sector or all the bytes of a split sector which are contained in the current data wedge are written to or read from. In addition, sectoring circuit 590 provides the last sector on line 656 at the output of comparator 654, which corresponds to decisional block 628 of the flow diagram of FIG. 11, to indicate when the last sector associated with the current header has been written to or read from.

Figure 13:
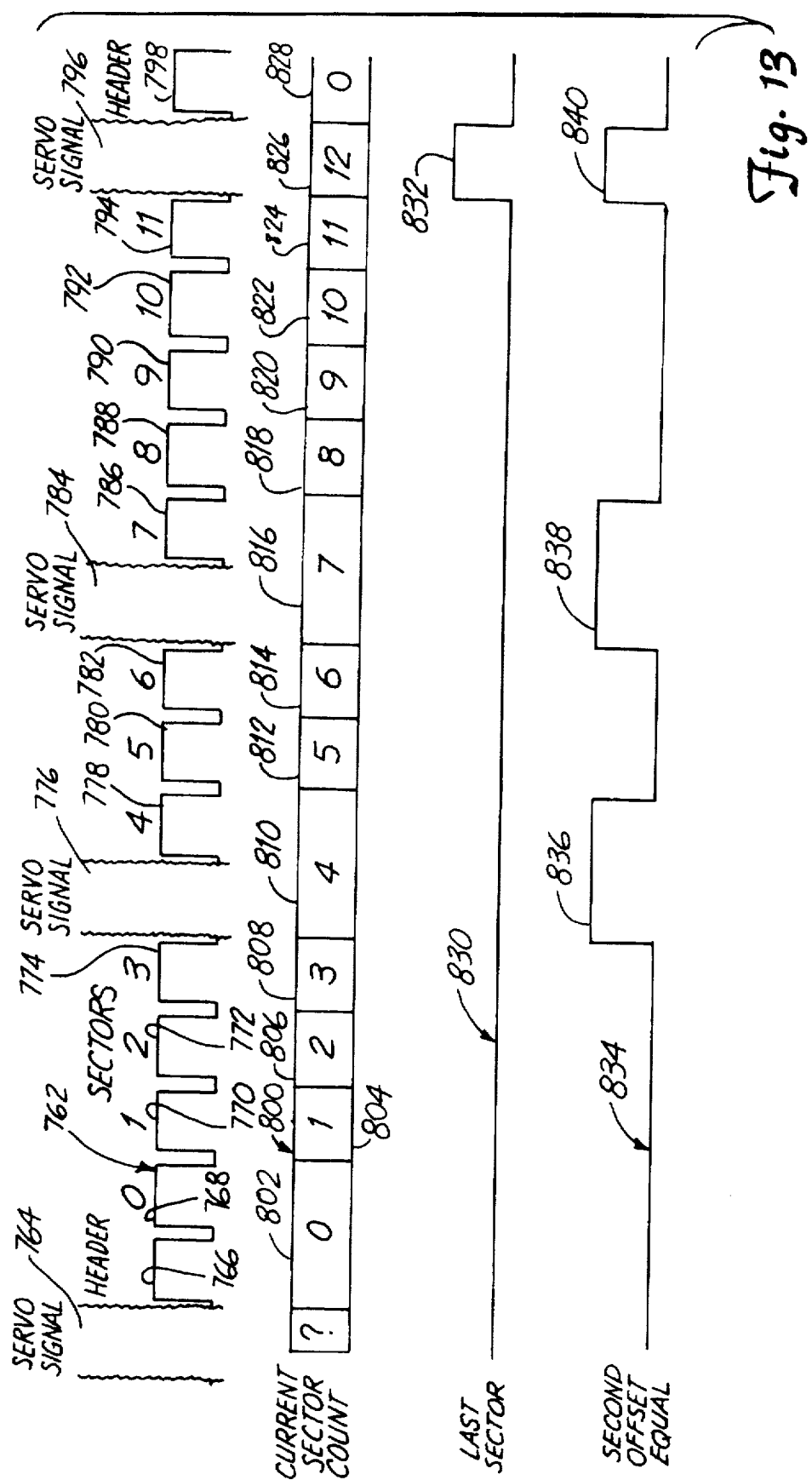
FIG. 13 is a timing diagram illustrating the operation of the sectoring circuit of FIG. 12.

An example of the second method of handling a multiple data wedge per header case is illustrated in timing diagram form in FIG. 13. An illustrative waveform 762 shows the waveform of the NRZ format signal containing the header information and the sector data field information from read/write circuitry 36 as interrupted by the receipt of the servo signals from read/write circuitry 36. As illustrated, a first servo signal portion is received at time point 764 and a first header is received over the NRZ format signal at time point 766. In the first data wedge, the sector zero data is received at time point 768, the sector one data is received at time point 770 the sector two data is received at time point 772, and the sector three data is received at time point 774.

A second servo signal portion is received at time point 776. For the second data wedge, sector four is received at time point 778, sector five is received at time point 780, and sector six is received at time point 782. A third servo signal portion is received at time point 784. For the third data wedge, sector seven is received at time point 786, sector eight is received at time point 788, sector nine is received at time point 790, sector ten is received at time point 792, and sector eleven is received at time point 794. A fourth servo signal portion is received at time point 796 and followed by the receipt of a second header at time point 798. Thus, in this example, sectoring circuit 590 receives 12 sectors associated with the header received at time point 766, which are split into three data wedges. The first and second data wedges are separated by the servo signal portion at time point 776 and the second and third data wedges are separated by the servo signal portion at time point 784.

The current sector count provided by current sector counter 646 is represented in FIG. 13 as counter contents 800 that change over time. With the receipt of the first header at time point 766, the current sector count is reset to zero, as indicated at contents time point 802. After sector zero is received at time point 768, current sector counter 646 increments the current sector count to a one, as indicated at contents time point 804. After sector one is received at time point 770, the current sector count is incremented to a two, as indicated at contents time point 806. Likewise, after the receipt of sector two at time point 772, the current sector count is incremented to a three, as indicated at contents time point 808, and after the receipt of sector three at time point 774, the current sector count is incremented to a four, as indicated at contents time point 810. In a likewise manner, as the second data wedge sectors four, five, and six are received at time points 778, 780, and 782, the current sector count is respectively incremented to a five at contents time point 812, to a six at contents time point 814, and to a seven at contents time point 816. With the receipt of the third data wedge sectors seven, eight, nine, ten, and eleven at time points 786, 788, 790, 792, and 794, the current sector count is respectively incremented to an eight at contents time point 818, to a nine at contents time point 820, to a ten at contents time point 822, to an eleven at contents time point 824, and to a twelve, at contents time point 826. With the receipt of the second header at time point 798, the current sector count is reset to zero, as indicated at contents time point 828.

The value of the last sector signal provided on line 656 is indicated by waveform 830. As indicated, the last sector signal on line 656 is active at time point 832 when the current sector count is incremented to a twelve at contents time point 826, which corresponds to when the current sector count is equal to the total number of sectors represented by the total sector field for the associated header stored in total sector register 638.

The value of the second offset equal signal provided on line 756 is indicated by waveform 834. As indicated, the second offset equal signal on line 756 is active at time point 836 when the current sector count is incremented to a four at contents time point 810, which corresponds to when the current sector count is equal to the number of sectors represented by the second offset number for the first data wedge stored in second offset register stack 694. Similarly, the second offset equal signal on line 756 is active at time point 838 when the current sector count is incremented to a seven at contents time point 816, which corresponds to when the current sector count is equal to the number of sectors represented by the second offset number for the second data wedge stored in second offset register stack 694. The second offset signal on line 756 is also active at time point 840 when the current sector count is incremented to a twelve at contents time point 826, which corresponds to when the current sector count is equal to the number of sectors represented by the second ofset number for the third data wedge stored in second offset register stack 694.

Conclusion

The present invention as described above for sectoring circuits 22, 290, and 590 uses the reliability of the servo signal from read/write circuitry 36 to indicate the duration of the detection of the embedded servo pattern by transducer head 30. In addition, the present invention permits separate processing of the header errors and the data field errors. By having the offset fields in the header which indicate a distribution of bytes for sectors split between data wedges, the sectoring circuits according to the present invention provide for varying number of sectors per header within a recording zone or from zone to zone. Thus, the sectoring scheme of the present invention permits flexibility, such as in a soft sectoring scheme, in an embedded servo rotating disc data storage device to vary the number of sectors associated with a header from the maximum number of sectors per header for the given sectoring circuit to a fraction of a sector. The number of sectors per header on a given portion of a data storage disc can be optimized based on this range of flexibility to increase the amount of data stored on the data storage disc. The priry limitation to the maximum number of sectors which can be associated with a single header is the size of the header itself. Therefore, the overhead of storage locations allocated to the header essentially determines the range of flexibility of the sectoring scheme according to the present invention and will vary depending on the particular application.

Although the present invention has been described with reference to preferred embodiments, workers skilled in the art will recognize that changes may be made in form and detail without departing from the spirit and scope of the invention.

What is claimed is:

1. A sectoring circuit for locating data storage sectors in a series of concentric data tracks of differing diameters ona rotating zoned disc of a data storage device, the disc having different numbers of sectors in track portions of respective zOnes, the data storage device having a transducer head positioned by a servo systems relative to the rotating disc for writing to and reading from the sectors, the servo system providing servo error signals in response to the transducer head passing over servo patterns embedded in the rotating disc interrupting the tracks, the sectors positioned in data wedges formed by track portions extending between respective pairs of said servo patterns, the sectoring circuit comprising:

an input receiver for receiving and storing information from a header, the header being stored on the rotating disc and associatedx with at least one of said data wedges, the input receiver locating the header in reference to at least one of said servo patterns, the header informtiaon having an identification field identifying the header, a first offset field indicating the number of selected data groupings of the first sector of an associated data wedge stored in the associated data wedge, a second offset field indicating the number of selected data groupings of the last sector of the associated data wedge stored in the associated data wedge, and a total sector field representing the total number of complete sectors and fractions of sectors stored in the associated data wedge;

a current sector counter for counting a number of sectors written or read by the transducer since the input receiver received the header to provide a current sector count representing said number of sectors; and a controller for locating the sectors based on values of the identification field, the first offset field, the second offset field, the total sector field, and the current sector count.

2. The sectoring circuit of claim 1 wherein the selected data grouping is a byte and further comprising:

a byte counter for counting a number of bytes of the current sector which have been written or read by the transducer head to provide a byte count representing said number of bytes, wherein the controller locates the sectors based on the byte count.

3. The sectoring circuit of claim 1 wherein the input receiver receives and stores information from the header in response to a servo signal from the servo system indicating a duration of the detection of the servo pattern by the transducer head.

4. The sectoring circuit of claim 1 further comprising:

a header error processor for detecting and correcting errors in the header information; and a data error processor for detecting and correcting errors in the data written to or read from the sectors wherein the header error processor detects and corrects errors in the header information independently from the data error processor detecting and correcting errors in the data written to or read from the sectors.

5. The sectoring circuit of claim 4 wherein the data error processor detects and corrects errors in the data written to or read from the current sector only if all the selected data groupings of the current sector have been written or read.

6. The sectoring circuit of claim 1 wherein the input receiver further receives and stores defect management bits from the header information which indicate defective sectors of the current data wedge and wherein the sectoring circuit further comprises:

means responsive to the defect management bits to prevent the transducer head from writing to or reading from the defective sectors.

7. The sectoring circuit of claim 1 wherein the header is associated a plurality of said data wedges.

8. (Twice Amended) A data storage system for storing data storage sectors in a series of concentric data tracks of differing diameters on a rotating zoned disc, the zoned disc having different numbers of sectors in track portions of respective zones, the data storage system comprising:

a transducer head for writing to and reading from the sectors;

a servo system for positioning the transducer head relative to the rotating disc and providing servo error signals in response to the transducer head passing over servo patterns embedded in the rotating disc interrupting the tracks, wherein the sectors are positioned in data wedges formed by track portions extending between respective pairs of said servo patterns;

an input receiver for receiving and storing information representative of a header, the header being stored on the rotating disc and associated with at least one of said data wedges, the input receiver locating the header in reference to at least one of said servo patterns, the header infonnation having an identification field identifying the header, a first offset field indicating the number of selected data groupings of the first sector of an associated data wedge stored in the associated data wedge, a second offset field indicating the number of selected data groupings of the last sector of the associated data wedge stored in the associated data wedge, and a total sector field representing the total number of complete sectors and fractions of sectors stored in the associated data wedge;

a current sector counter for counting a number of sectors written or read by the transducer since the input receiver received the header to provide a current sector count representing said number of sectors; and a location controller for locating the sectors based on values of the identification field, the first offset field, the second offset field, the total sector field and the current sector count to provide location signals to the read/write controller.

9. The data storage system of claim 8 wherein the servo system includes a read/write controller for enabing the transducer head to write to and read from the sectors.

10. A method for locating data storage sectors in a series of concentric data tracks of differing diameters on a rotating zoned disc of a data storage device, the :zoned disc having different numbers of sectors in track portions of respective zones, having a transducer head positioned by a servo system relative to the rotating disc for writing to and reading from the sectors, the servo system providing servo error signals in response to the transducer head passing over servo patterns embedded in the rotating disc interrupting the tracks, the sectors positioned in data wedges formed by track portions etending between respective pairs of said servo patterns, the method comprising.

locating a header in reference to at least one of said servo patterns, the header being stored on the rotating disc and associated with at least one of said data wedges;

receiving and storing information from the header including an identification field identifying the header, a first offset field indicating the number of selected data groupings of the first sector of an associated data wedge stored in the associate data wedge, a second offset field indicating the number of selected data groupings of the last sector of the associated data wedge stored in the associated data wedge, and a total sector field representing the total number of complete sectors and fractions of sectors stored in the associated data wedge;

counting a number of sectors written or read by the transducer head since receiving the header; and locating the sectors based on values of the identification field, the first offset field, the second offset field, the total sector field, and the sector count.

11. The method of claim 10 wherein the selected data grouping is a byte and further comprising the step of counting a number of bytes of the current sector which have been written or read by the transducer head, wherein the sectors are located based on said number of bytes.

12. The method of claim 10 wherein the information from the header is received and stored in response to a servo signal indicating a duration of the detection of the servo pattern by the transducer head.

13. The method of claim 10 further comprising the steps of detecting and correcting errors in the header information, and detecting and correcting errors in the data written to or read from the sectors wherein the step of detecting and correcting errors in the header information is independent from the step of detecting and correcting errors in the data written to or read from the sectors.

14. The method claim 13 wherein the step of detecting and correcting errors in the data written to or read from the current sector is performed only if all the selected data groupings of the current sector have been written or read.

15. The method of claim 10 wherein the header information furthyyer includes defect management bits which indicate defective sectors of the current data wedge and wherein the method further comprnse the step of preventing the transducer head from writing to or read from the defective sectors in response to the defect management bits.

16. The method of claim 10 wherein the header is associated with a plurality of said data wedges.

* * * * *

UNITED STATES PATENT AND TRADEMARK OFFICE
CERTIFICATE OF CORRECTION

PATENT NO. : 5,754,351
DATED : MAY 19, 1998
INVENTOR(S) : CHI-FOUN KUEN ET AL.

It is certified that error appears in the above-identified patent and that said Letters Patent is hereby corrected as shown below:

On the title page,

In the ABSTRACT [57], line 15, delete "distnbution", insert --distribution--

Col. 1, line 8, after "mass.", delete "."

Col. 1, line 15, after "next", insert --.--

Col. 1, line 45, delete "becase", insert --because--

Col. 2, line 20, delete "resilts", insert --results--

Col. 2, line 21, delete "diadvantages", insert --disadvantages--

Col. 2, line 22, delete "diadvantages", insert --disadvantages--

Col. 2, line 44, delete "sis", insert --signals--

Col. 2, line 57, delete "locan", insert --location--

Col. 2, line 60, delete "aliment", insert --alignment--

Col. 3, line 25, delete "pars", insert --pairs--

Col. 3, line 63, delete "detecng", insert --detecting--

Col. 4, line 2, delete "becuse", insert --because--

Col. 4, line 4, delete "al", insert --all--

Col. 5, line 1, after "conventional", insert --,--

Col. 5, line 17, delete "circuity", insert --circuitry--

UNITED STATES PATENT AND TRADEMARK OFFICE
CERTIFICATE OF CORRECTION

PATENT NO. : 5,754,351

DATED : MAY 19, 1998

INVENTOR(S) : CHI-FOUN KUEN ET AL.

It is certified that error appears in the above-identified patent and that said Letters Patent is hereby corrected as shown below:

Col. 5, line 24, after "data track", insert --.--

Col. 5, line 37, after "signals", delete "-"

Col. 6, line 6, delete "lustrates", insert --illustrates--

Col. 6, line 28, delete "pluraity", insert --plurality--

Col. 6, line 28, after "sector", insert --.--

Col. 6, line 41, delete "ment", insert --fragment--

Col. 6, line 65, after "track", insert --.--

Col. 8, line 12, delete "oft", insert --offset--

Col. 10, line 3, after "words", insert --,--

Col. 10, line 27, delete 'scond", insert --second--

Col. 11, line 6, after "from", insert --.--

Col. 11, line 67, delete 'wnte", insert --write--

Col. 12, line 9, after "sector equal signal", insert --,--

Col. 12, line 11, delete "circuity", insert --circuitry--

Col. 12, line 28, delete "microprocsor", insert --microprocessor--

Col. 12, line 41, delete "microprocsor", insert --microprocessor--

Col. 12, line 47, after "operation", insert --.--

UNITED STATES PATENT AND TRADEMARK OFFICE
CERTIFICATE OF CORRECTION

PATENT NO. : 5,754,351

DATED : MAY 19, 1998

INVENTOR(S) : CHI-FOUN KUEN ET AL.

It is certified that error appears in the above-identified patent and that said Letters Patent is hereby corrected as shown below:

Col. 15, line 5, delete "diagam", insert --diagram--

Col. 16, line 47, delete "trsducer", insert --transducer--

Col. 16, line 49, delete "pulss", insert --pulses--

Col. 17, line 8, delete "desional", insert --decisional--

Col. 17, line 8, delete "sectonng", insert --sectoring--

Col. 17, line 16, delete "desional", insert --decisional--

Col. 17, line 18, delete "slipped", insert --skipped--

Col. 18, line 22, delete "supended", insert --suspended--

Col. 18, line 46, delete "assiated", insert --associated--

Col. 18, line 63, delete "specifes", insert --specifies--

Col. 19, line 11, delete "incroprocessor", insert --microprocessor--

Col. 19, line 54, delete "assoiated", insert --associated--

Col. 21, line 25, delete "seetor", insert --sector--

Col. 22, line 24, delete "offet", insert --offset--

Col. 23, line 6, delete "fronl", insert --from--

Col. 23, line 14, delete "contaiing", insert --containing--

UNITED STATES PATENT AND TRADEMARK OFFICE
CERTIFICATE OF CORRECTION

PATENT NO. : 5,754,351

DATED : MAY 19, 1998

INVENTOR(S) : CHI-FOUN KUEN ET AL.

It is certified that error appears in the above-identified patent and that said Letters Patent is hereby corrected as shown below:

Col. 23, line 25, after "442", insert --.--

Col. 23, line 29, delete "tim", insert --time--

Col. 23, line 41, delete "ime", insert --time--

Col. 23, line 47, delete "secondservo signaportion", insert --second servo signal portion--

Col. 23, line 47, delete "te", insert --time--

Col. 24, line 15, delete "sed", insert --second--

Col. 24, line 41, delete "s28", insert --528--

Col. 24, line 55, delete "sectoing", insert --sectoring--

Col. 24, line 60, after "invention", insert --.--

Col. 25, line 8, delete "microprocesor", insert --microprocessor--

Col. 25, line 35, delete "sldpped", insert --skipped--

Col. 25, line 40, delete "emboiment", insert --embodiment--

Col. 25, line 40, delete "descnbed", insert --described--

Col. 25, line 44, delete "microprocesor", insert --microprocessor--

Col. 26, line 46, delete "sput setor", insert --split sector--

Col. 26, line 47, delete "feld", insert --field--

UNITED STATES PATENT AND TRADEMARK OFFICE
CERTIFICATE OF CORRECTION

PATENT NO. : 5,754,351
DATED : MAY 19, 1998
INVENTOR(S) : CHI-FOUN KUEN ET AL.

It is certified that error appears in the above-identified patent and that said Letters Patent is hereby corrected as shown below:

Col. 26, line 53, delete "detectikon", insert --detection--

Col. 26, line 55, delete "frnit", insert --fragment--

Col. 26, line 57, delete "specal", insert --special--

Col. 26, line 62, delete "wu", insert --was--

Col. 26, line 62, delete "setor", insert --sector--

Col. 26, line 63, delete "operationL", insert --operation--

Col. 26, line 64, delete "blodc", insert --block--

Col. 26, line 66, delete "traderred", insert --transferred--

Col. 27, line 2, delete "desional", insert --decisional--

Col. 27, line 7, delete "fom", insert --from--

Col. 27, line 7, delete "sctor", insert --sector--

Col. 27, line 41, delete "fromn", insert --from--

Col. 27, line 64, delete "necessry", insert --necessary--

Col. 28, line 31, delete "counL", insert --count--

Col. 29, line 17, delete "offsector", insert --offset sector--

UNITED STATES PATENT AND TRADEMARK OFFICE
CERTIFICATE OF CORRECTION

PATENT NO. : 5,754,351
DATED : MAY 19, 1998
INVENTOR(S) : CHI-FOUN KUEN ET AL.

It is certified that error appears in the above-identified patent and that said Letters Patent is hereby corrected as shown below:

Col. 30, line 19, delete "offet", insert --offset--

Col. 30, line 20, delete "assoiated", insert --associated--

Col. 30, line 28, delete "mustrated", insert --illustrated--

Col. 30, line 37, delete "becuse", insert --because--

Col. 30, line 45, delete "subtracing", insert --subtracting--

Col. 31, line 5, after "provides", delete "."

Col. 33, line 5, delete "ofset", insert --offset--

Col. 33, line 27, delete "priry", insert --primary--

Col. 33, line 41, delete "ona", insert --on a--

Col. 33, line 44, delete "zOnes", insert --zones--

Col. 33, line 55, delete "associatedx", insert --associated--

Col. 34, line 45, delete "(Twice Amended)"

Col. 34, line 64, delete "infonnation", insert --information--

UNITED STATES PATENT AND TRADEMARK OFFICE
CERTIFICATE OF CORRECTION

PATENT NO. : 5,754,351

DATED : MAY 19, 1998

INVENTOR(S) : CHI-FOUN KUEN ET AL.

It is certified that error appears in the above-identified patent and that said Letters Patent is hereby corrected as shown below:

Col. 35, line 17, delete "enabing", insert --enabling--

Col. 35, line 21, delete ":"

Col. 35, line 29, delete "etending", insert --extending--

Col. 36, line 32, delete "furthyyer", insert --further--

Col. 36, line 34, delete "comprnse", insert --comprises--

Signed and Sealed this

First Day of June, 1999

Attest:

Attesting Officer

Q. TODD DICKINSON

Acting Commissioner of Patents and Trademarks